US009420250B2

United States Patent
Laganiere et al.

(10) Patent No.: US 9,420,250 B2
(45) Date of Patent: Aug. 16, 2016

(54) VIDEO ANALYTICS METHOD AND SYSTEM

(76) Inventors: Robert Laganiere, Gatineau (CA); William Murphy, Los Altos, CA (US); Pascal Blais, Ottawa (CA); Jason Phillips, Lower Sackville (CA)

( * ) Notice: Subject to any disclaimer, the term of this patent is extended or adjusted under 35 U.S.C. 154(b) by 1087 days.

(21) Appl. No.: 13/500,720

(22) PCT Filed: Oct. 7, 2010

(86) PCT No.: PCT/CA2010/001608
§ 371 (c)(1),
(2), (4) Date: Apr. 6, 2012

(87) PCT Pub. No.: WO2011/041904
PCT Pub. Date: Apr. 14, 2011

(65) Prior Publication Data
US 2012/0194676 A1    Aug. 2, 2012

Related U.S. Application Data

(60) Provisional application No. 61/249,384, filed on Oct. 7, 2009.

(51) Int. Cl.
*H04N 7/18* (2006.01)
*H04N 9/804* (2006.01)
*H04L 12/64* (2006.01)

(52) U.S. Cl.
CPC .......... *H04N 9/8042* (2013.01); *H04L 12/6418* (2013.01); *H04N 7/181* (2013.01)

(58) Field of Classification Search
USPC ........................................................ 348/143
See application file for complete search history.

(56) References Cited

U.S. PATENT DOCUMENTS 6,166,729 A    12/2000   Acosta et al.
6,195,117 B1    2/2001   Miyazaki et al.
(Continued)

FOREIGN PATENT DOCUMENTS

JP    2004120178 A    4/2004
JP    2004180290 A    6/2004
(Continued)

OTHER PUBLICATIONS

Saptharish, M. et al.. "An Information Value Driven Architecture for Urban Video Surveillance in Data and Attention Bandwidth Constrained Environments," Proceedings of the Sixth IEEE International Conference on Advanced Video and Signal Based Surveillance, pp. 122-127, Sep. 2-4, 2009.

*Primary Examiner* — Chikaodili E Anyikire
(74) *Attorney, Agent, or Firm* — The Noblitt Group, PLLC

(57) ABSTRACT

A method for performing video analytics comprises capturing video data using a video source disposed at an acquisition end. The captured video data is stored at the acquisition end, and non-adjacent single frames of the captured video data are transmitted from the acquisition end to a server via an IP network. The non-adjacent single frames of captured video data are transmitted one at a time at known time intervals, or a burst of a plurality of non-adjacent single frames is transmitted at another known time interval. At the server, video analytics is performed on a current one of the non-adjacent single frames for detecting an actionable event relative to a previous one of the non-adjacent single frames. In response to detecting an actionable event, a signal for requesting previously stored video data captured between the current one of the non-adjacent single frames and the previous one of the non-adjacent single frames is transmitted to the acquisition end via the IP network.

23 Claims, 13 Drawing Sheets

(56) References Cited

U.S. PATENT DOCUMENTS

| | | |
|---|---|---|
| 6,462,785 B1 | 10/2002 | Carraro et al. |
| 6,831,675 B2 | 12/2004 | Shachar et al. |
| 6,879,998 B1 | 4/2005 | Raciborski et al. |
| 7,111,045 B2 | 9/2006 | Kato et al. |
| 7,382,244 B1 | 6/2008 | Donovan |
| 7,397,821 B2* | 7/2008 | Meidan ............... H04L 1/0083 370/474 |
| 7,839,926 B1 | 11/2010 | Metzger et al. |
| 7,881,505 B2 | 2/2011 | Schneiderman et al. |
| 8,041,338 B2 | 10/2011 | Chen et al. |
| 8,139,817 B2 | 3/2012 | Laganiere |
| 8,185,959 B2 | 5/2012 | Bellwood et al. |
| 8,290,999 B2 | 10/2012 | Shepherd et al. |
| 8,326,327 B2 | 12/2012 | Hymel et al. |
| 8,335,763 B2 | 12/2012 | Narayanan et al. |
| 8,396,246 B2 | 3/2013 | Anbalagan et al. |
| 8,433,136 B2 | 4/2013 | Epshtein et al. |
| 8,473,420 B2 | 6/2013 | Bohus |
| 2003/0025599 A1 | 2/2003 | Monroe |
| 2003/0070177 A1 | 4/2003 | Kondo et al. |
| 2003/0107648 A1 | 6/2003 | Stewart et al. |
| 2003/0167176 A1 | 9/2003 | Knudson et al. |
| 2003/0204856 A1 | 10/2003 | Buxton |
| 2004/0240546 A1 | 12/2004 | Wells |
| 2005/0169546 A1 | 8/2005 | Shin |
| 2005/0185823 A1* | 8/2005 | Brown ............ G08B 13/19604 382/103 |
| 2005/0195823 A1 | 9/2005 | Chen et al. |
| 2005/0271250 A1 | 12/2005 | Vallone et al. |
| 2006/0053459 A1 | 3/2006 | Simerly et al. |
| 2006/0192698 A1 | 8/2006 | Morel |
| 2006/0195569 A1 | 8/2006 | Barker |
| 2006/0239645 A1 | 10/2006 | Curtner et al. |
| 2006/0271658 A1 | 11/2006 | Beliles |
| 2007/0013776 A1 | 1/2007 | Venetianer |
| 2007/0035632 A1 | 2/2007 | Silvernail et al. |
| 2007/0082700 A1 | 4/2007 | Landschaft et al. |
| 2007/0172155 A1 | 7/2007 | Guckenberger |
| 2007/0217765 A1 | 9/2007 | Itoh et al. |
| 2008/0108339 A1 | 5/2008 | Shaffer et al. |
| 2008/0129844 A1 | 6/2008 | Cusack et al. |
| 2008/0136908 A1 | 6/2008 | Carter |
| 2008/0166966 A1 | 7/2008 | Hamasaki et al. |
| 2008/0184245 A1 | 7/2008 | St-Jean |
| 2008/0235592 A1 | 9/2008 | Trauth |
| 2008/0243614 A1 | 10/2008 | Tu et al. |
| 2008/0258880 A1 | 10/2008 | Smith et al. |
| 2008/0270490 A1 | 10/2008 | Watterott et al. |
| 2008/0279481 A1 | 11/2008 | Ando |
| 2008/0304565 A1 | 12/2008 | Sakhardande et al. |
| 2009/0015671 A1 | 1/2009 | Addy |
| 2009/0021583 A1 | 1/2009 | Salgar et al. |
| 2009/0031381 A1 | 1/2009 | Cohen et al. |
| 2009/0122150 A1 | 5/2009 | Shabtay et al. |
| 2009/0141939 A1 | 6/2009 | Chambers |
| 2009/0141993 A1 | 6/2009 | Ma et al. |
| 2009/0174763 A1 | 7/2009 | Bengtsson et al. |
| 2009/0189981 A1 | 7/2009 | Siann et al. |
| 2009/0213245 A1 | 8/2009 | Harper et al. |
| 2009/0217343 A1 | 8/2009 | Bellwood |
| 2009/0219387 A1 | 9/2009 | Marman |
| 2009/0219411 A1* | 9/2009 | Marman ............... H04N 5/772 348/231.99 |
| 2009/0225164 A1 | 9/2009 | Renkis |
| 2009/0238542 A1 | 9/2009 | Adiletta et al. |
| 2009/0245573 A1 | 10/2009 | Saptharishi et al. |
| 2009/0324137 A1 | 12/2009 | Stallings et al. |
| 2010/0097471 A1* | 4/2010 | Drive ............ G08B 13/19669 348/159 |
| 2010/0158315 A1 | 6/2010 | Martin |
| 2010/0177938 A1 | 7/2010 | Martinez et al. |
| 2010/0191827 A1 | 7/2010 | Martin |
| 2010/0231714 A1 | 9/2010 | Flores et al. |
| 2011/0022529 A1 | 1/2011 | Barsoba et al. |
| 2011/0092248 A1 | 4/2011 | Evanitsky |
| 2011/0109742 A1 | 5/2011 | Laganiere |
| 2011/0112899 A1 | 5/2011 | Strutton et al. |
| 2011/0113461 A1 | 5/2011 | Laganiere |
| 2011/0157315 A1* | 6/2011 | Bennett ............... G06F 3/14 348/46 |
| 2011/0273563 A1* | 11/2011 | Murphy ............... H04N 7/18 348/143 |
| 2011/0314159 A1 | 12/2011 | Murphy |
| 2012/0015668 A1 | 1/2012 | Mgrdechian et al. |
| 2012/0033026 A1 | 2/2012 | Murphy |
| 2012/0033027 A1 | 2/2012 | Murphy |
| 2012/0033028 A1 | 2/2012 | Murphy |
| 2012/0033031 A1 | 2/2012 | Murphy |
| 2012/0036262 A1 | 2/2012 | Murphy |
| 2012/0098918 A1 | 4/2012 | Murphy |
| 2012/0129553 A1 | 5/2012 | Phillips et al. |
| 2012/0195363 A1 | 8/2012 | Laganiere |
| 2012/0207349 A1 | 8/2012 | Murphy |
| 2012/0207356 A1 | 8/2012 | Murphy |
| 2014/0036073 A1 | 2/2014 | Black |
| 2014/0036090 A1 | 2/2014 | Black |

FOREIGN PATENT DOCUMENTS

| | | |
|---|---|---|
| JP | 2006279464 A | 10/2006 |
| WO | WO 2005/004062 A2 | 1/2005 |
| WO | WO 2006/012384 A2 | 2/2006 |
| WO | 2008092255 A1 | 8/2008 |
| WO | WO 2008/092255 A1 | 8/2008 |
| WO | 2008154003 A2 | 12/2008 |
| WO | WO 2008/154003 A2 | 12/2008 |
| WO | 2009111377 A1 | 9/2009 |
| WO | WO 2009/111377 A1 | 9/2009 |

* cited by examiner

VIDEO ANALYTICS METHOD AND SYSTEM

CROSS-REFERENCES TO RELATED APPLICATIONS

This application claims the benefit of PCT Patent Application No. PCT/CA2010/001608, filed Oct. 7, 2010, which claims benefit to U.S. Provisional Patent Application No. 61/249,384, filed Oct. 7, 2009, and incorporates the disclosure of each application in its entirety by reference.

FIELD OF THE INVENTION

The instant invention relates generally to video analytics, and more particularly to a method and system for transmitting video data from a video acquisition end to a central location via an Internet Protocol (IP) network.

BACKGROUND OF THE INVENTION

Modern security and surveillance systems have come to rely very heavily on the use of video surveillance cameras for the monitoring of remote locations, entry/exit points of buildings or other restricted areas, and high-value assets, etc. The majority of surveillance video cameras that are in use today are analog. Analog video surveillance systems run coaxial cable from closed circuit television (CCTV) cameras to centrally located videotape recorders or hard drives. Increasingly, the resultant video footage is compressed on a digital video recorder (DVR) to save storage space. The use of digital video systems (DVS) is also increasing; in DVS, the analog video is digitized, compressed and packetized in IP, and then streamed to a server.

More recently, IP-networked digital video systems have been implemented. In this type of system the surveillance video is encoded directly on a digital camera, in H.264 or another suitable standard for video compression, and is sent over Ethernet at a lower bit rate. This transition from analog to digital video is bringing about long-awaited benefits to security and surveillance systems, largely because digital compression allows more video data to be transmitted and stored. Of course, a predictable result of capturing larger amounts of video data is that more personnel are required to review the video that is provided from the video surveillance cameras. Advantageously, storing the video can reduce the amount of video data that is to be reviewed, since the motion vectors and detectors that are used in compression can be used to eliminate those frames with no significant activity. However, since motion vectors and detectors offer no information as to what is occurring, someone still must physically screen the captured video to determine suspicious activity.

Another disadvantage of network-based video surveillance and centralized video monitoring solutions is that the network may become overloaded due to the large amount of video data that is involved. This problem is particularly severe when the traffic has to pass over a wide area network, where a service provider typically is charging for the transit of data. In such systems, video data are transmitted constantly to a central location or server for processing and storage. When the video data are to be viewed, additional bandwidth is needed to retrieve the stored information. Of course, a significant amount of video that is recorded today does not contain any relevant or actionable data. For instance, a surveillance camera may record video for hours before a person of interest walks into the field of view, or a suspicious car drives into a monitored parking lot late at night. As a result, there has been a push to develop methods that significantly increase the effectiveness of monitoring security and surveillance video.

The market is currently seeing a migration toward IP-based hardware edge devices with built-in video analytics, such as IP cameras and encoders, including passive infrared (PIR) based motion detection, analytics on a box, etc. Video analytics electronically recognizes the significant features within a series of frames and allows the system to issue alerts when specific types of events occur, thereby speeding real-time security response. Automatically searching the captured video for specific content also relieves personnel from tedious hours of reviewing the video, and decreases the number of personnel that is required to screen the video. Furthermore, when 'smart' cameras and encoders process images at the edge, they record or transmit only important events, for example only when someone enters a predefined area that is under surveillance, such as a perimeter along a fence. Accordingly, deploying an edge device is one method to reduce the strain on the network in terms of system requirements and bandwidth.

Unfortunately, deploying 'smart' cameras and encoders or analytics on DVR at the edge carries a significantly higher cost premium compared to deploying a similar number of basic digital or analog cameras. Since the analytics within the cameras is designed into the cameras, there is a tradeoff between flexibility and cost, with higher cost solutions providing more flexibility. In essence, to support changing functionality requires a new camera or a significantly higher cost initial camera or local DVR.

Accordingly, it would be advantageous to provide a method and system that overcomes at least some of the above-mentioned limitations.

SUMMARY OF EMBODIMENTS OF THE INVENTION

In accordance with an aspect of the invention there is provided a method capturing video data using a video source disposed at an acquisition end; storing the captured video data at the acquisition end; transmitting non-adjacent single frames of the captured video data from the acquisition end to a server via an IP network, the non-adjacent single frames of captured video data being transmitted one at a time at known time intervals; at the server, performing video analytics on a current one of the non-adjacent single frames for detecting an actionable event relative to a previous one of the non-adjacent single frames; and, in response to detecting an actionable event, transmitting to the acquisition end via the IP network a signal for requesting previously stored video data captured between the current one of the non-adjacent single frames and the previous one of the non-adjacent single frames.

In accordance with an aspect of the invention there is provided a method capturing video data at a known frame rate using a video source disposed at an acquisition end; transmitting non-adjacent single frames of the captured video data to a remote location via an IP network, the non-adjacent single frames of video data being transmitted at a first rate that is substantially slower than the known frame rate; at a remote location, performing video analytics on each of the non-adjacent single frames of captured video data for detecting an actionable event; and, in response to detecting the actionable event, transmitting from a remote location to the acquisition end via the IP network a signal for increasing the rate of transmission of the non-adjacent single frames of video data to a second rate.

In accordance with an aspect of the invention there is provided a method providing a first video source at a first acquisition end, the first video source relating to a first client; providing a second video source at a second acquisition end, the second video source relating to a second client; providing a server that is in communication with the first and second video sources via an IP network; using the server, performing video analytics on video data provided separately to the server via the IP network from each one of the first video source and the second video source, the video analytics performed for detecting actionable events within the provided video data; and, providing in a selective manner an alarm signal to one of the first client and the second client in response to detecting an actionable event within the video data provided from one of the first video source and the second video source, respectively.

In accordance with an aspect of the invention there is provided a method comprising: providing a server farm comprising a plurality of servers; providing a video source at an acquisition end, the video source in communication with the server farm via the IP network; capturing video data at a known frame rate using the video source at the acquisition end; transmitting non-adjacent single frames of the captured video data to the server farm via the IP network; performing video analytics on the non-adjacent single frames of the captured video data using the plurality of servers of the server farm; and, detecting an actionable event based on a result of the video analytics performed by at least one server of the plurality of servers of the server farm.

In accordance with an aspect of the invention there is provided a method comprising: capturing video data at a known frame rate using a video source disposed at an acquisition end; transmitting non-adjacent single frames of the captured video data to at least one computer of a plurality of different computers via an IP network, the at least one computer determined to be currently inactive; using the at least one computer of the plurality of different computers, performing video analytics on the non-adjacent single frames of the captured video data provided thereto; and, detecting an actionable event based on a result of the video analytics performed by the at least one computer of the plurality of different computers.

In accordance with an aspect of the invention there is provided a system, comprising: a server farm comprising a plurality of servers in communication one with the other; a video source disposed at an acquisition end and remote from the server farm, the video source in communication with the server farm via an IP network; and, a process in execution on the servers of the plurality of servers for receiving from the acquisition end non-adjacent single frames of video data captured using the video source, for performing video analytics on a current one of the non-adjacent single frames to detect an actionable event relative to a previous one of the non-adjacent single frames, and for, in response to detecting the actionable event, transmitting to the acquisition end via the IP network a signal for requesting previously stored video data captured between the current one of the non-adjacent single frames and the previous one of the non-adjacent single frames.

In accordance with an aspect of the invention there is provided a system, comprising: a server farm comprising a plurality of servers in communication one with the other; a video source disposed at an acquisition end and remote from the server farm, the video source in communication with the server farm via an IP network; and, a process in execution on the servers of the plurality of servers for receiving from the acquisition end non-adjacent single frames of video data captured using the video source, for performing video analytics on a current one of the non-adjacent single frames to detect an actionable event relative to a previous one of the non-adjacent single frames, and for, in response to detecting the actionable event, transmitting to the acquisition end via the IP network a signal for affecting previously stored video data captured previous to the current one of the non-adjacent single frames of video data.

BRIEF DESCRIPTION OF THE DRAWINGS

Exemplary embodiments of the invention will now be described in conjunction with the following drawings, wherein similar reference numerals denote similar elements throughout the several views, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
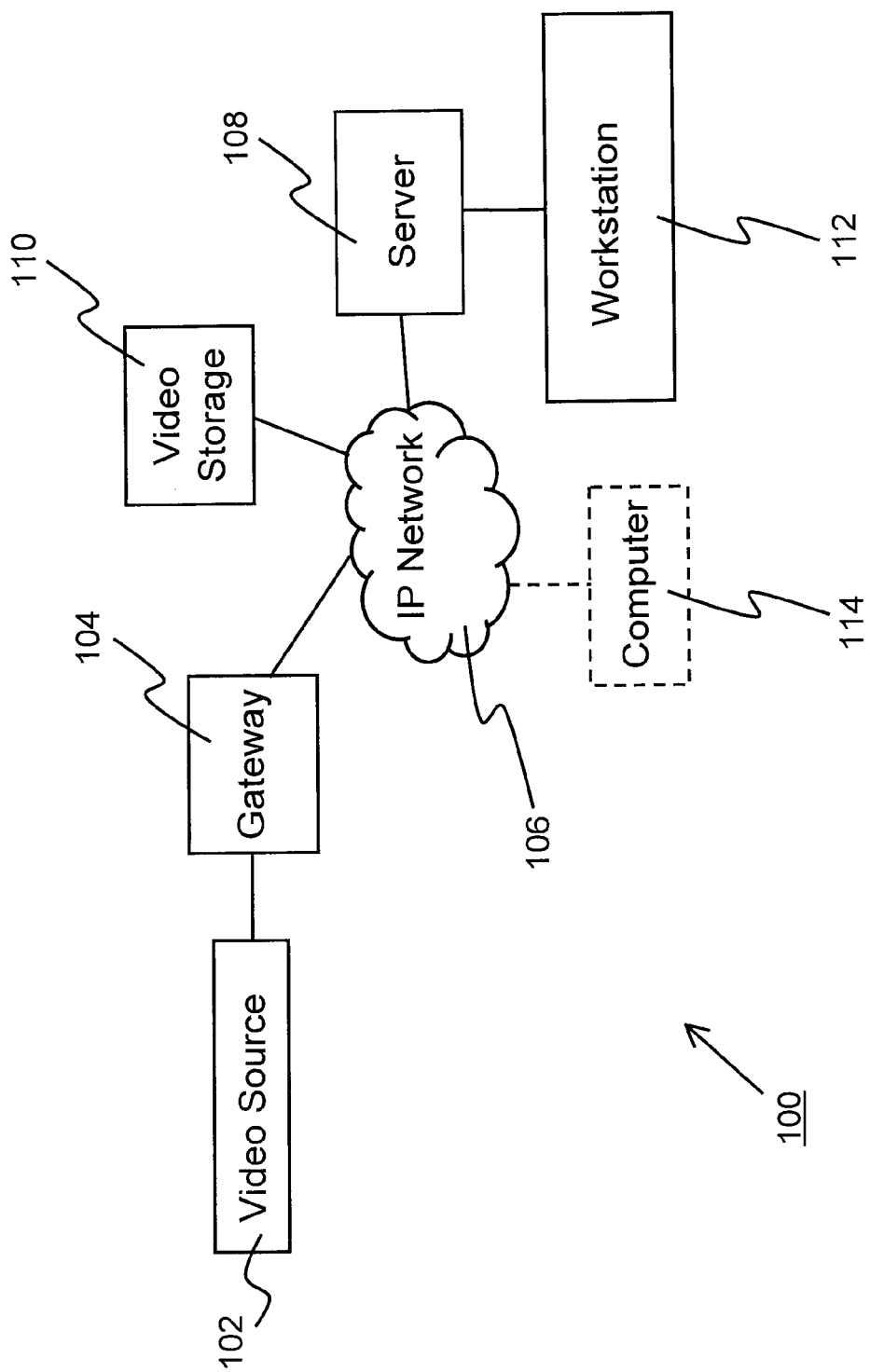
FIG. 1 is a schematic block diagram of a video monitoring system that is suitable for implementing a method according to an embodiment of the instant invention, including a single video source.

Referring to FIG. 1, shown is a schematic block diagram of a video monitoring system that is suitable for implementing a method according to an embodiment of the instant invention. The video monitoring system 100 includes a video source 102 disposed at an acquisition end. In the instant embodiment the video source 102 is a network IP camera, such as for instance an AXIS 211M Network Camera or another suitable device. Optionally, the video source 102 is a mobile device, such as for instance a camera embedded in a smart phone or a laptop computer. Video data captured using the video source 102 are transmitted via gateway 104 to an IP network 106, such as for instance the Internet. Optionally, the video source 102 connects to the IP network without a gateway 104.

As is shown in FIG. 1, a server 108 and a video storage device 110 are also in communication with the IP network 106. By way of a specific and non-limiting example, the video storage device 110 is one of a digital video recorder (DVR) and a network video recorder (NVR), or a storage device in box with a searchable file structure. A workstation 112, including a not illustrated personal computer, display and input device, is in communication with server 108 for supporting end-user control and video review functions. Alternatively, the server 108 and the workstation 112 are combined, comprising for instance a personal computer including a display and input device. Optionally, a computer 114 is provided in communication with the IP network 106 for supporting remote access of the video data that is captured by the video source 102. For instance, a client uses a web browser application that is in execution on computer 114 for monitoring portions of the video data that are captured by the video source 102.

Referring still to FIG. 1, the video source 102 is deployed at the acquisition end for monitoring a known field of view (FOV). For example, the video source 102 monitors one of a parking lot, an entry/exit point of a building, and a stack of shipping containers. The video source 102 captures video data of the FOV at a known frame rate, typically 30 FPS, and performs on-board compression of the captured video data using a suitable compression standard such as for instance MPEG-4 or H.264. Non-adjacent single frames of the compressed video data are provided to the server 108 via gateway 104 and IP network 106. For instance, video source 102 is set to transmit the contents of its frame buffer at predetermined intervals of time. By way of a specific and non-limiting example, video source 102 is set to transmit the contents of its frame buffer every 30 seconds. In this way, non-adjacent single frames of the captured video data are transmitted over the IP network 106 at a transmission rate that is substantially slower than the known frame rate. Transmission of single frames of video data at a rate of one frame every 30 seconds results in an approximately 900-fold reduction of the volume of data being transmitted over the IP network 106 compared to streaming the captured video at the full frame rate.

Figure 2:
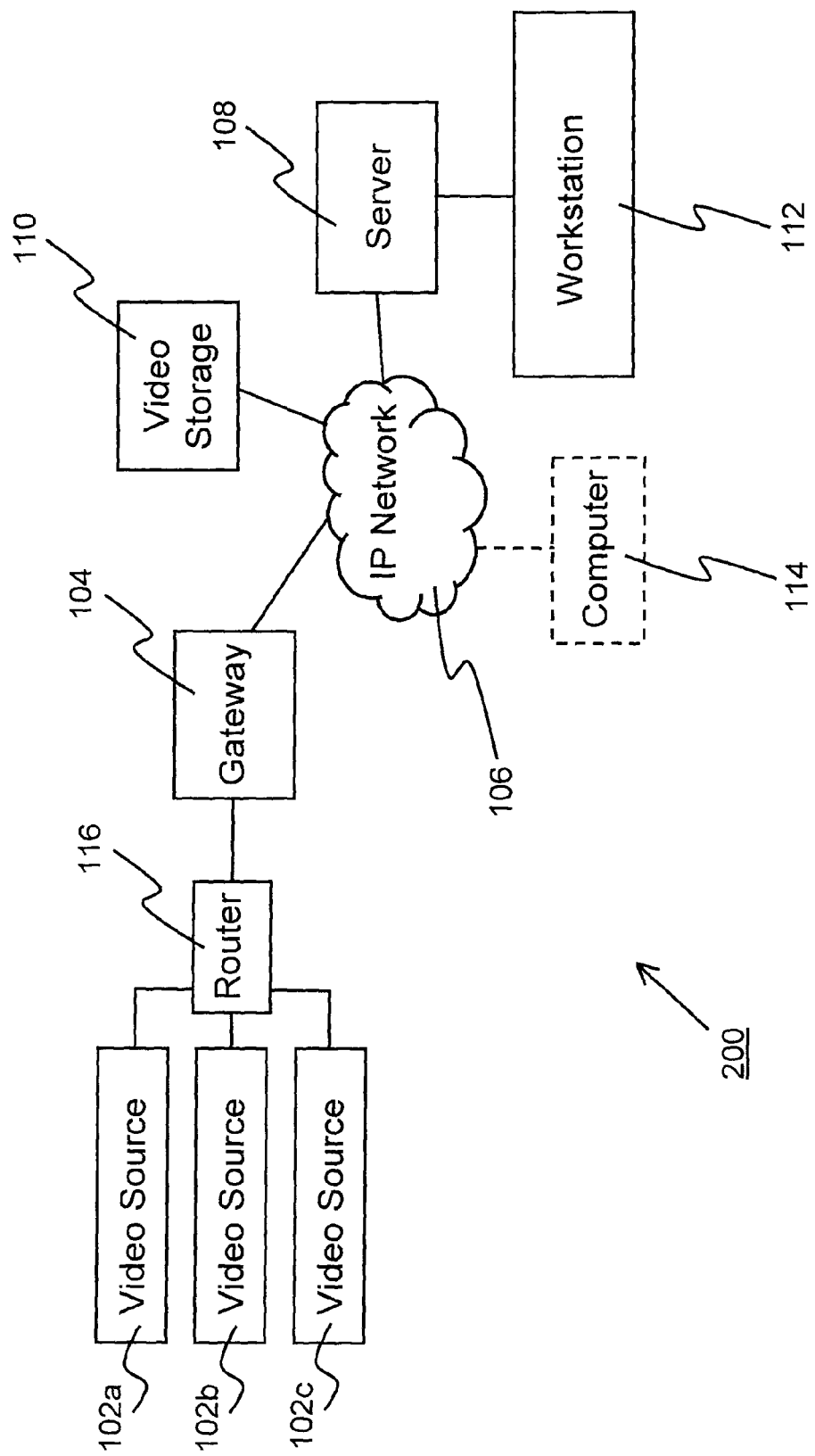
FIG. 2 is a schematic block diagram of another video monitoring system that is suitable for implementing a method according to an embodiment of the instant invention, including a plurality of video sources at the same location.

Referring now to FIG. 2, shown is a schematic block diagram of a video monitoring system 200 that is suitable for implementing a method according to an embodiment of the instant invention. In the embodiment of FIG. 2, a plurality of video sources 102a-c associated with a same client is disposed at the acquisition end for monitoring a known field of view (FOV). For example, a first video source 102a monitors a parking lot, a second video source 102b monitors an entry/exit point of a building, and a third video source 102c monitors a stack of shipping containers. Each one of the video sources 102a-c captures video data at a known frame rate, typically 30 FPS, and performs on-board compression of the captured video data using a suitable compression standard such as for instance MPEG-4 or H.264. Each video source provides non-adjacent single frames of compressed video data to the server 108 via router 116, gateway 104 and IP network 106. For instance, each video source 102a-c is set to transmit the contents of its frame buffer at predetermined intervals of time. In one embodiment the predetermined time intervals are different for at least some of the video sources 102a-c. In another embodiment, the predetermined time intervals are the same for each of the video sources 102a-c. In an embodiment the video frames are synchronized one to another such that a known time interval exists therebetween. In another embodiment, the video cameras are unsynchronized. Optionally, the video sources 102a-c connects to the IP network without a gateway 104.

Referring now to FIGS. 1 and 2, the server 108 receives the non-adjacent single frames of captured video data via the IP network 106, and performs video analytics thereon for detecting actionable events. Different actionable events may be defined based on the type of asset that is being monitored within the FOV of a particular video source 102 or 102a-c, and based upon the nature of unauthorized or suspicious activity that is anticipated. By way of a few specific and non-limiting examples, actionable events include: an unknown car entering a monitored parking lot; a visitor approaching a monitored building entry/exit point; and, removal of a monitored shipping container from the FOV of a video source 102 or 102a-c. Accordingly, an actionable event is detected when a video analytics process identifies the occurrence of a client-defined change in a frame of captured video data, relative to a baseline condition. Typically, a video analytics process in execution on the server 108 is used to search for a client defined, or system defined, actionable event in a frame of video data that is captured at time t, relative to a frame of video data that is captured at time t−Δt. Typically, changes such as movement of foliage, weather conditions, street traffic, animal movements, etc. are ignored, as the video analytics process learns what is extraneous background motion such as a waving tree or flapping flag, etc.

In order to facilitate a better understanding of the operating principles of the systems that are shown in FIGS. 1 and 2, the specific example of monitoring an entry/exit point of a building will now be discussed. The following discussion is provided for illustrative purposes only and is not intended to limit the systems that are shown in FIGS. 1 and 2 to any specific application. Prior to the occurrence of a client-defined actionable event, the video source 102 or 102a-c provides non-adjacent single frames of video data to the server 108 via the IP network 106. For instance, the non-adjacent single frames are transmitted at ten second intervals. During this time, each transmitted frame contains video data that is substantially static based on the defined parameters of the video analytics process. When a visitor approaches the building entry-exit point, their image is captured by the video source 102 or 102a-c and is included in the frame of video data that is transmitted to server 108 at the end of the next time interval. The server 108 performs video analytics on the frame of video data that includes the image of the visitor, and detects an actionable event based on identifying a change in the frame of video data relative to the previous non-adjacent frame of video data. Provided the interval of time between transmission of successive non-adjacent single frames of video data is sufficiently short, by the time the actionable event is detected the visitor is likely to be some distance away from the building entry/exit point. Accordingly, in response to detecting the actionable event the server transmits a signal to the video source 102 or 102a-c requesting initiation of fuller frame-rate transmission of captured video data, from a camera buffer, via the IP network 106. For instance, the server requests either full frame-rate transmission, such as 30 FPS, or at least transmission of non-adjacent frames of video data at substantially shorter time intervals, such as for instance one frame every half second. The fuller frame-rate video data is stored on video storage device 110, and is optionally retrieved at a later time to be reviewed by a human operator. In addition to requesting fuller frame rate transmission of video data, server 108 optionally provides an alarm signal to the client via one of the IP network 106, a not illustrated telephone system or a not illustrated pager service, etc. The client optionally accesses and reviews the fuller frame-rate video data or another video stream from the video source using optional computer 114 or a suitable mobile device, etc.

Optionally, the frames are captured at fixed or non-fixed intervals and sent are as a single burst to optimize CPU set-up for analytics, rather than sending each separate frame individually.

Referring now only to FIG. 2, according to another embodiment one of the video sources 102a-c is a "trigger" camera. For instance, video source 102a monitors an entry/exit point of a building and transmits non-adjacent single frames of video data to the server via the IP network 106 at ten second intervals. Of course, the interval between capturing single frames can be varied, and optionally the frames are stored in a camera buffer and sent once per minute, or at some other interval of time during which a plurality of single frames is, so as to reduce the set-up time per CPU for the analytics. The other video sources 102b and 102c are inactive prior to the occurrence of an actionable event. When server 108 detects an actionable event, a signal is transmitted via IP network 106 from the server 108 to video sources 102b and 102c, causing the video sources 102b and 102c to begin transmitting video data to the server 108 via IP network 106. Optionally, video sources 102b and 102c transmit full-frame rate video data to the server 108 via IP network 106. Alternatively, less than full-frame rate video data is transmitted to the server 108 via IP network 106. In either case, the video data is stored on video storage device 110. Optionally, the trigger sends one or more single frame (picture or set of pictures) from one or more videos via an email alert to a customer, who can decide whether he wants video to be recorded from one or more cameras.

Optionally, video sources 102b and 102c continue to transmit video data to the server 108 via IP network 106 for a predetermined period of time, or until a cancellation signal is received from the server 108. For instance, the cancellation signal is sent to video sources 102b and 102c from the server 108 subsequent to the visitor being identified as an authorized individual, or in dependence upon some other criterion being satisfied.

Referring again to FIGS. 1 and 2, in a different mode of operation video analytics is performed on each of the non-adjacent frames of video data that are transmitted to server 108, in order to confirm that the captured video data includes desired content. For instance, in a secure area such as a bank or an airport one or more video sources 102 or 102a-c are deployed for capturing images of the face of each visitor. Non-adjacent frames of video data are transmitted to the server 108 via IP network 106 at predetermined intervals of time, such as for instance one frame each second. When a result of video analytics performed on a frame of video data indicates that the frame contains a suitable image of a visitor's face, the frame of video data is stored in a log file on video storage device 110. Optionally, the server 108 sends a signal to video source 102 or 102a-c to initiate transmission of non-adjacent single frames of video data at a slower rate of transmission until a new visitor enters the FOV. Further optionally, additional frames of video data captured using the video source 102 or 102a-c are added to the log file in association with the previously stored frame containing the suitable image of the visitor's face. Such a log file is useful for identification purposes and tracking of visitors during a known period of time.

Figure 3:
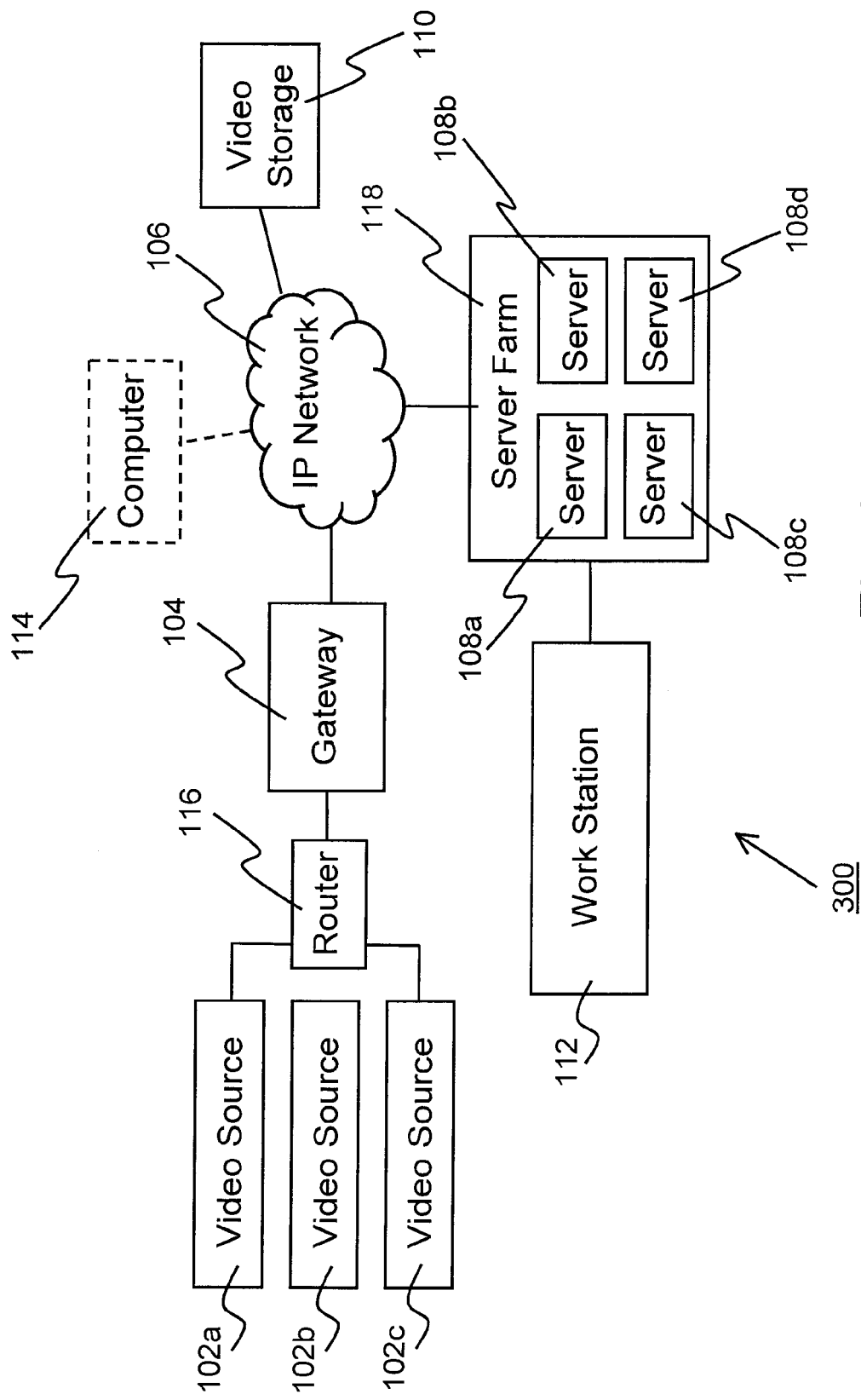
FIG. 3 is a schematic block diagram of another video monitoring system that is suitable for implementing a method according to an embodiment of the instant invention, including a plurality of video sources at the same location and a server farm for performing video analytics on video data.

Referring now to FIG. 3, shown is a schematic block diagram of a video monitoring system 300 that is suitable for implementing a method according to an embodiment of the instant invention. In the embodiment of FIG. 3 a server farm 118, which comprises a plurality of servers 108a-d, replaces the server 108 of FIGS. 1 and 2. Optionally, the server farm 118 comprises any number of servers that is other than four, i.e. 2, 3, 5, 6 etc.). Video sources 102a-c associated with a same client are disposed at the acquisition end for monitoring a known field of view (FOV). For example, a first video source 102a monitors a parking lot, a second video source 102b monitors an entry/exit point of a building, and a third video source 102c monitors a stack of shipping containers. Each one of the video sources 102a-c captures video data at a known frame rate, typically 30 FPS, (however for commercial monitoring the normal rate is 5 fps, that said 30 fps provides high quality video which may be desirable in some applications), and performs on-board compression of the captured video data using a suitable compression standard such as for instance MPEG-4 or 11.264 or MJPEG. Each video source provides non-adjacent single frames of compressed video data to the server farm 118 via router 116, gateway 104 and IP network 106. For instance, each video source 102a-c is set to transmit the contents of its frame buffer at predetermined intervals of time. In one embodiment the predetermined time intervals are different for at least some of the video sources 102a-c. In another embodiment, the predetermined time intervals are the same for each of the video sources 102a-c. Optionally, the video sources 102a-c connects to the IP network without a gateway 104.

Optionally, the frames are captured at fixed or non-fixed intervals and sent are as a single burst to optimize CPU set-up for analytics, rather than sending each separate frame individually.

The system 300 operates in a manner similar to that described with reference to FIGS. 1 and 2. However, in system 300 the video analytics is performed using server farm 118 comprising a plurality of servers 108a-d instead of using a single server 108. In one mode of operation, each non-adjacent single frame of video data is provided to each server 108a-d of the server farm 118. Each server 108a-d performs video analytics on the received frame of video data using a different video analytics process. In this way, a client may define a plurality of different actionable events, and each different server 108a-d of the server farm 118 is for detecting a different actionable event. In another mode of operation the servers 108a-d perform video analytics in parallel for each received frame of video data. In another mode of operation, different servers 108a-d perform video analytics on different frames of video data. For instance, server 108a performs video analytics on a frame of video data captured at time t−3Δt, server 108b performs video analytics on a frame of video data captured at time t−2Δt, server 108c performs video analytics on a frame of video data captured at time t−Δt, and server 108d performs video analytics on a frame of video data captured at time t.

Figure 4:
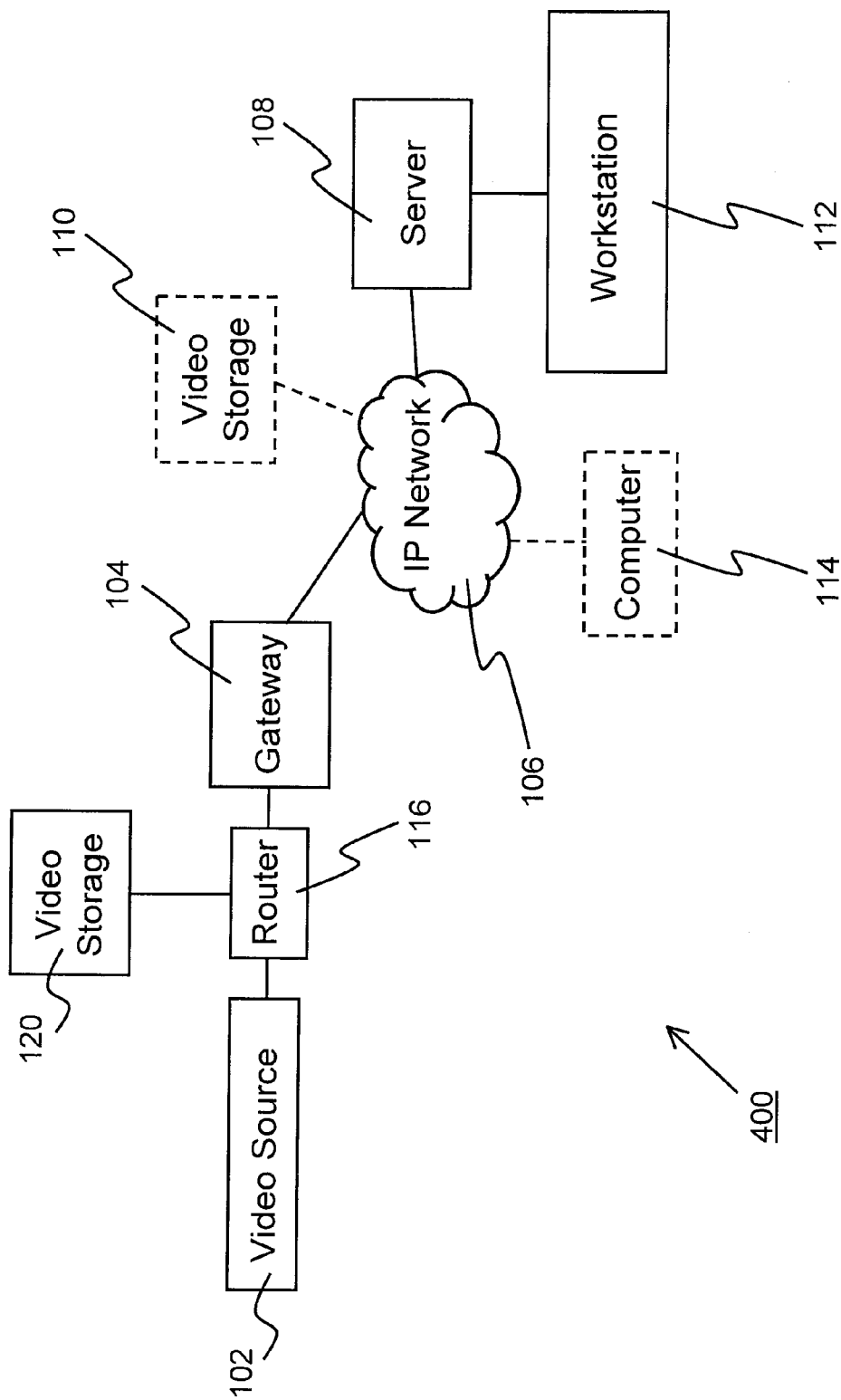
FIG. 4 is a schematic block diagram of another video monitoring system that is suitable for implementing a method according to an embodiment of the instant invention, including a single video source and local storage of video data at the acquisition end.

Referring now to FIG. 4, shown is a schematic block diagram of another video monitoring system that is suitable for implementing a method according to an embodiment of the instant invention. The video monitoring system 400 includes a video source 102 disposed at an acquisition end. In the instant embodiment the video source 102 is a network IP camera, such as for instance an AXIS 211M Network Camera or another similar device. Video data captured using the video source 102 are transmitted via router 116 and gateway 104 to an IP network 106, such as for instance the Internet. Optionally, the video source 102 connects to the IP network 106 without a gateway 104. A video storage device 120 is provided at the acquisition end, in communication with router 116. By way of a specific and non-limiting example, the optional video storage device 110 is one of a digital video recorder (DVR) and a network video recorder (NVR), etc. The video storage device 120 stores video data that is captured using video source 102. For instance, the video storage device 120 stores full frame-rate video data that is captured using video source 102. Alternatively, the video storage device 120 stores less than full frame-rate video data that is captured using video source 102.

As is shown in FIG. 4, a server 108 is also in communication with the IP network 106. A workstation 112, including a not illustrated personal computer, display and input device, is in communication with server 108 for supporting end-user control and video review functions. Alternatively, the server 108 and the workstation 112 are combined, comprising for instance a personal computer including a display and input device. Optionally, a computer 114 is provided in communication with the IP network 106 for supporting remote access of the video data that is captured using the video source 102. For instance, a client uses a web browser application that is in execution on computer 114 for monitoring portions of the video data that are captured by the video source 102. Optionally, a video storage device 110 is provided in communication with the IP network 106. By way of a specific and non-limiting example, the optional video storage device 110 is one of a DVR and a NVR.

Referring still to FIG. 4, the video source 102 is deployed at the acquisition end for monitoring a known field of view (FOV). For example, the video source 102 monitors one of a parking lot, an entry/exit point of a building, and a stack of shipping containers. The video source 102 captures video data of the FOV at a known frame rate, typically 30 FPS, and performs on-board compression of the captured video data using a suitable compression standard such as for instance MPEG-4 or H.264. Non-adjacent single frames of the compressed video data are provided to the server 108 via gateway 104 and IP network 106. For instance, video source 102 is set to transmit the contents of its frame buffer at predetermined intervals of time. By way of a specific and non-limiting example, video source 102 is set to transmit the contents of its frame buffer every 30 seconds. In this way, non-adjacent single frames of the captured video data are transmitted over the IP network 106 at a transmission rate that is substantially slower than the known frame rate. Transmission of single frames of video data at a rate of one frame every 30 seconds results in an approximately 900-fold reduction of the volume of data being transmitted over the IP network 106 compared to streaming the captured video at the full frame rate.

Figure 5:
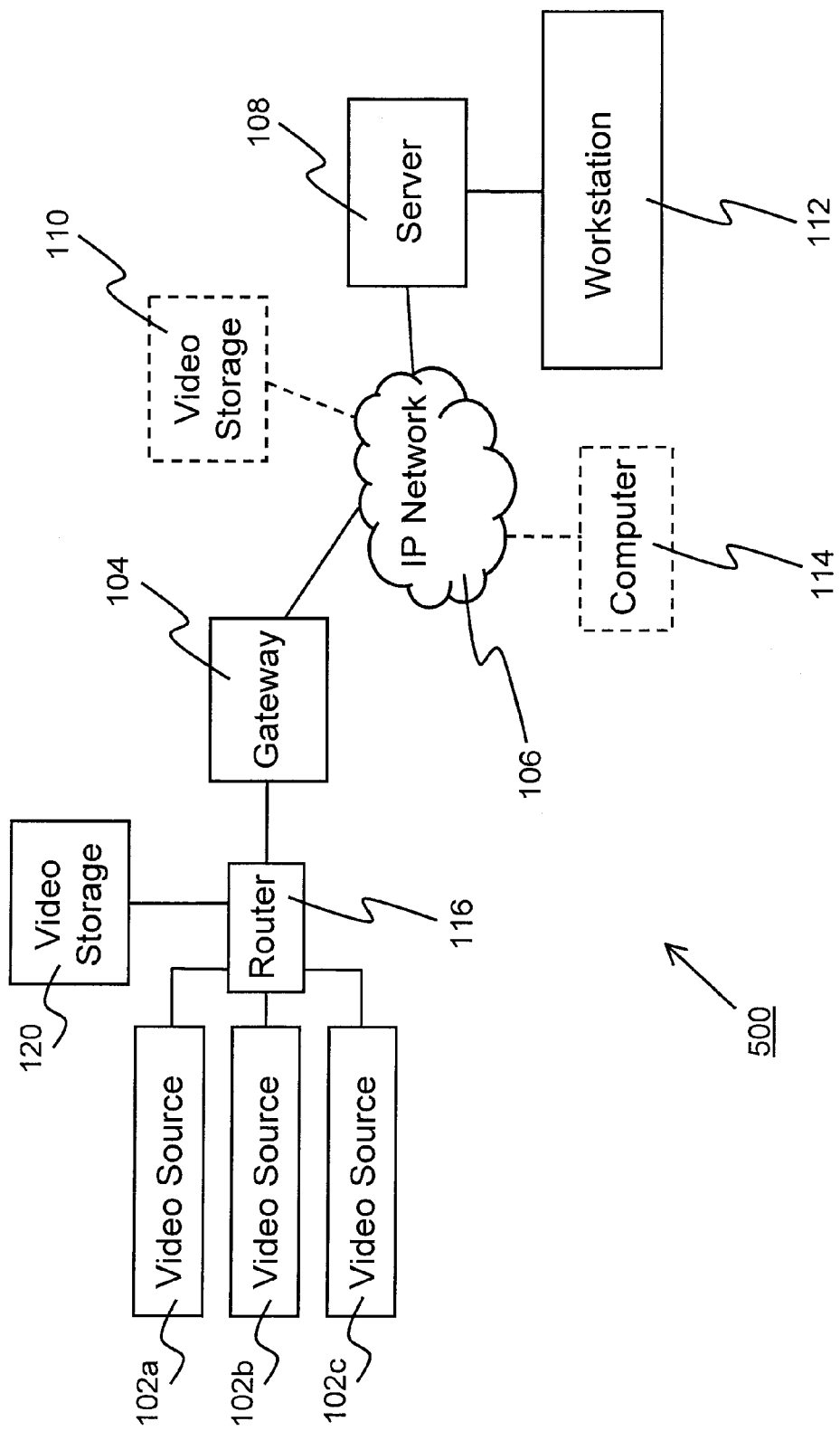
FIG. 5 is a schematic block diagram of another video monitoring system that is suitable for implementing a method according to an embodiment of the instant invention, including a plurality of video sources at the same location and local storage of video data at the acquisition end.

Referring now to FIG. 5, shown is a schematic block diagram of a video monitoring system 500 that is suitable for implementing a method according to an embodiment of the instant invention. In the embodiment of FIG. 5 a plurality of video sources 102a-c associated with a same client are disposed at the acquisition end for monitoring a known field of view (FOV). For example, a first video source 102a monitors a parking lot, a second video source 102b monitors an entry/exit point of a building, and a third video source 102c monitors a stack of shipping containers. Each one of the video sources 102a-c captures video data at a known frame rate, typically 30 FPS, and performs on-board compression of the captured video data using a suitable compression standard such as for instance MPEG-4 or H.264. Each video source provides non-adjacent single frames of compressed video data to the server 108 via router 116, gateway 104 and IP network 106. For instance, each video source 102a-c is set to transmit the contents of its frame buffer at predetermined intervals of time. In one embodiment the predetermined time intervals are different for at least some of the video sources 102a-c. In another embodiment, the predetermined time intervals are the same for each of the video sources 102a-c. Optionally, the video sources 102a-c connects to the IP network without a gateway 104.

Each video source 102a-c also provides video data via the router 116 to video storage device 120 for being stored thereon. For instance, the video storage device 120 stores full frame-rate video data that is captured using video sources 102a-c. Alternatively, the video storage device 120 stores less than full frame-rate video data that is captured using video source 102a-c.

Referring now to FIGS. 4 and 5, the server 108 receives the non-adjacent single frames of captured video data via the IP network 106, and performs video analytics thereon for detecting actionable events. Different actionable events may be defined based on the type of asset that is being monitored within the FOV of a particular video source 102 or 102a-c, and based upon the nature of unauthorized or suspicious activity that is anticipated. By way of a few specific and non-limiting examples, actionable events include: an unknown car entering a monitored parking lot; a visitor approaching a monitored building entry/exit point; and, removal of a monitored shipping container from the FOV of a video source 102 or 102a-c. Accordingly, an actionable event is detected when a video analytics process identifies the occurrence of a client-defined change in a frame of captured video data, relative to a baseline condition. Typically, a video analytics process in execution on the server 108 is used to search for a client defined actionable event in a frame of video data that is captured at time t, relative to a frame of video data that is captured at time t−Δt. Typically, changes such as movement of foliage, weather conditions, street traffic, animal movements, etc. are ignored.

In order to facilitate a better understanding of the operating principles of the systems that are shown in FIGS. 4 and 5, the specific example of monitoring a stack of shipping containers will now be discussed. Typically, a shipping container that is stored in a container yard or in another secure area remains stationary for long periods of time. Thus, non-adjacent single frames of captured video data that are transmitted to the server 108 at one-minute time intervals, or even at time intervals of several minutes, are expected to include an image of the container. In this case, an actionable event occurs when the shipping container is identified within a frame of video data that is captured at time t−Δt, but it is not identified within the next non-adjacent frame of video data that is captured at time t. In other words, removal or theft of the container occurred between transmission of the frame of video data captured at time t−Δt and the next non-adjacent frame of video data captured at time t. Of course, assuming a sufficiently short interval of time Δt between transmission of successive non-adjacent single frames of captured video data, for instance between one second and one minute, the frame that is captured at time t may include image data of the removal in progress. As the interval of time Δt between transmission of successive non-adjacent single frames of captured video data increases, the likelihood decreases that the frame that is captured at time t will include image data of the theft in progress. However, in both instances when the actionable event is detected the server 108 provides a signal via the IP network 106 to the video storage device 120 at the acquisition end requesting transmission of fuller frame-rate video data captured between the frame that is captured at time t−Δt and the frame that is captured at time t. For instance, the server 108 requests either full frame-rate transmission, such as 30 FPS, or at least transmission of non-adjacent frames of video data at shorter time intervals, such as for instance one frame every half second. Optionally, in addition to requesting fuller frame-rate video data captured between time t−Δt and time t, the server 108 also sends a signal to video source 102 or 102a-c for initiating transmission of fuller frame-rate video data captured subsequent to time t. Optionally a prior captured video for longer than the time interval t−Δt is requested; for example, t−1 hour of stored video data is optionally requested to be provided or alternatively to be stored on the network storage device for later retrieval. In an embodiment, the network storage device acts as a loop recorder maintaining a known buffer of video data relating to a period of time immediately preceding the present time. As such, an amount of memory for the period of time is allocated and, only when an event is detected at the server, is that memory buffer or a portion thereof stored within a non-volatile portion of memory. Thus, the system supports changes in what is viewed after an event is detected and in what is viewable, analyzable, and stored before a video event is detected. Optionally, the server 108 performs video analytics on each frame of the requested video data. Further optionally, the requested video data is provided to workstation 112 and/or to computer 114 to be reviewed by a human operator.

The video storage device 120 at the acquisition end supports storage of up to full frame-rate video data captured using video sources 102 or 102a-c. Since the storage device 120 is located at the acquisition end, it is not necessary to transmit full frame-rate video data over the IP network unless a request for full frame-rate video data is provided from server 108 in response to detecting an actionable event.

Figure 6:
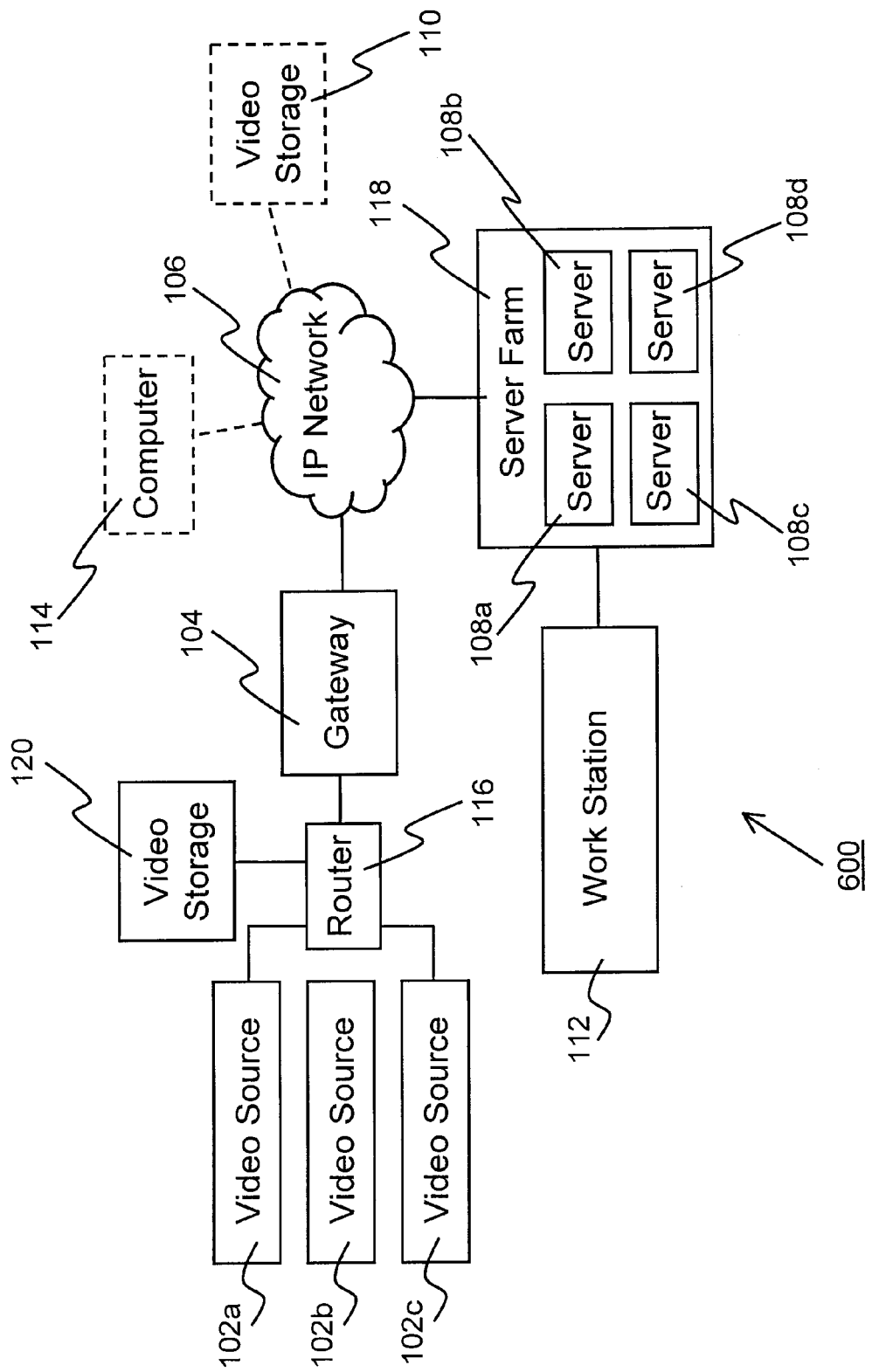
FIG. 6 is a schematic block diagram of another video monitoring system that is suitable for implementing a method according to an embodiment of the instant invention, including a plurality of video sources at the same location, a server farm for performing video analytics on video data, and local storage of video data at the acquisition end.

Referring now to FIG. 6, shown is a schematic block diagram of a video monitoring system 600 that is suitable for implementing a method according to an embodiment of the instant invention. In the embodiment of FIG. 6 a server farm 118, which comprises a plurality of servers 108a-d, replaces the server 108 of FIGS. 4 and 5. Optionally, the server farm 118 comprises a number of servers that is other than four. Video sources 102a-c associated with a same client are disposed at the acquisition end for monitoring a known field of view (FOV). For example, a first video source 102a monitors a parking lot, a second video source 102b monitors an entry/ exit point of a building, and a third video source 102c monitors a stack of shipping containers. Each one of the video sources 102a-c captures video data at a known frame rate, typically 30 FPS, and performs on-board compression of the captured video data using a suitable compression standard such as for instance MPEG-4 or H.264. Each video source provides non-adjacent single frames of compressed video data to the server farm 118 via router 116, gateway 104 and IP network 106. For instance, each video source 102a-c is set to transmit the contents of its frame buffer at predetermined intervals of time. In one embodiment the predetermined time intervals are different for at least some of the video sources 102a-c. In another embodiment, the predetermined time intervals are the same for each of the video sources 102a-c. Optionally, the video sources 102a-c connects to the IP network without a gateway 104.

The system 600 operates in a manner similar to that described with reference to FIGS. 4 and 5. However, in system 600 the video analytics is performed using server farm 118 comprising a plurality of servers 108a-d instead of using a single server 108. In one mode of operation, each non-adjacent frame of video data is provided to each server 108a-d of the server farm 118. Each server 108a-d performs video analytics on the received frame of video data using a different video analytics process. In this way, a client may define a plurality of different actionable events, and each different server 108a-d of the server farm 118 is for detecting a different actionable event. In another mode of operation the servers 108a-d perform video analytics in parallel for each received frame of video data. In still another mode of operation, different servers 108a-d perform video analytics on different frames of video data. For instance, server 108a performs video analytics on a frame of video data captured at time t−3Δt, server 108b performs video analytics on a frame of video data captured at time t−2Δt, server 108c performs video analytics on a frame of video data captured at time t−Δt, and server 108d performs video analytics on a frame of video data captured at time t.

Figure 7:
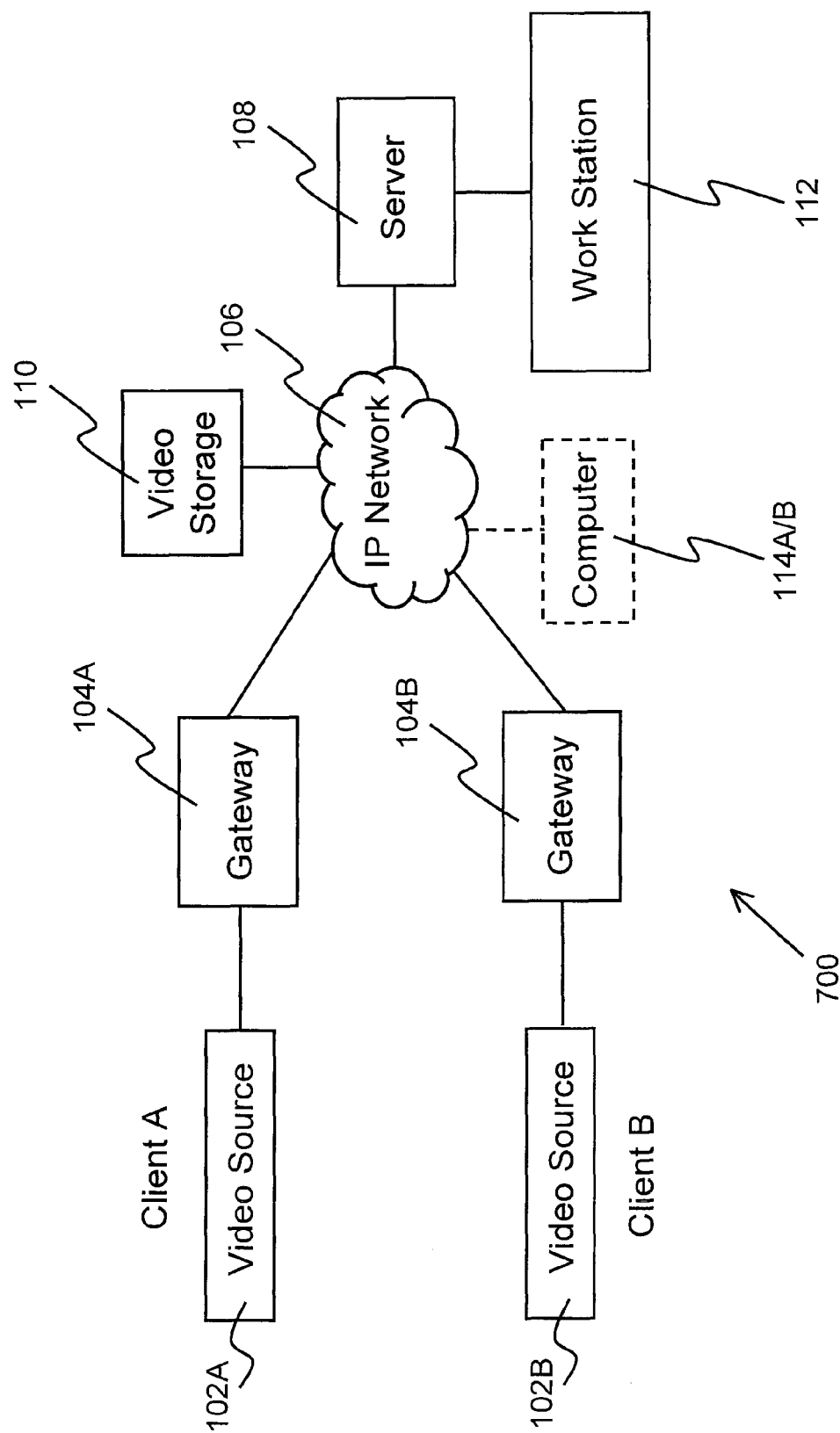
FIG. 7 is a schematic block diagram of another video monitoring system that is suitable for implementing a method according to an embodiment of the instant invention, including single video sources at each of a plurality of different locations.

Referring now to FIG. 7, shown is a schematic block diagram of a video monitoring system that is suitable for implementing a method according to an embodiment of the instant invention. The system 700 includes a first video source 102A associated with a first client 'A' and disposed at the acquisition end, and a second video source 102B associated with a second client 'B' and disposed at the acquisition end. In the instant embodiment the first and second video sources 102A and 102B, respectively, are network IP cameras, such as for instance an AXIS 211M Network Camera or another similar device. Video data that are captured using the video source 102A are transmitted via gateway 104A to an IP network 106, such as for instance the Internet. Similarly, video data that are captured using the video source 102B are transmitted via gateway 104B to the IP network 106. Optionally, one or both of the first and second video sources 102A and 102B connects to the IP network 106 without a gateway.

Referring still to FIG. 7, a server 108 and a video storage device 110 are also provided in communication with the IP network 106. By way of a specific and non-limiting example, the video storage device 110 is one of a digital video recorder (DVR) and a network video recorder (NVR). A workstation 112, including a not illustrated personal computer, display and input device, is in communication with server 110 for supporting end-user control and video review functions. Alternatively, the server 108 and the workstation 112 are combined, comprising for instance a personal computer including a display and input device. Optionally, at least a computer 114A/B is provided in communication with the IP network 106 for supporting remote access of the video that is captured by the first video source 102A or the second video source 1023. For instance, client 'A' uses a web browser application that is in execution on a computer 114A for monitoring portions of the video data that are captured by the video source 102A.

Referring still to FIG. 7, the video sources 102A and 102B are each deployed at the acquisition end for monitoring a known field of view (FOV). For example, the first video source 102A monitors one of a parking lot, an entry/exit point of a building, and a stack of shipping containers. Similarly, the second video source 102B monitors one of a parking lot, an entry/exit point of a building, and a stack of shipping containers. In general, the first video source 102A is deployed in accordance with instructions from client 'A' and the second video source 102B is deployed in accordance with instructions from client 'B.' Furthermore, the first video source 102A and the second video source 102B may be located almost anywhere in the world, provided there is an available connection to the IP network 106. Likewise, the server 108 and the video storage device 110 may be located almost anywhere in the world, provided there is an available connection to the IP network 106. Each video source 102A and 102B captures video data of the respective FOV at a known frame rate, typically 30 FPS, and performs on-board compression of the captured video data using a suitable compression standard such as for instance MPEG-4 or H.264. Non-adjacent single frames of the compressed video data are provided to the server 108 via gateway 106A or 106B and IP network 106. For instance, first video source 102A is set to transmit the contents of its frame buffer at predetermined intervals of time. Similarly, second video source 102B is set to transmit the contents of its frame buffer at predetermined intervals of time. By way of a specific and non-limiting example, video source 102A is set to transmit the contents of its frame buffer every 30 seconds and video source 102B is set to transmit the contents of its frame buffer every five seconds. In this way, non-adjacent single frames of the video data captured by both video sources 102A and 102B are transmitted over the IP network 106 at a transmission rate that is substantially slower than the respective known frame rate. Transmission of single frames of video data at a rate of one frame every 30 seconds results in an approximately 900-fold reduction of the volume of data being transmitted over the IP network 106 compared to streaming the captured video at the full frame rate. Similarly, transmission of single frames of video data at a rate of one frame every five seconds results in an approximately 150-fold reduction of the volume of data being transmitted over the IP network 106 compared to streaming the captured video at the full frame rate.

The operating principles of system 700 are substantially similar to those of system 100, as described in detail with reference to FIG. 1. That being said, system 700 supports video monitoring operations for a plurality of different clients, including clients 'A' and 'B,' with video analytics functions for all clients being performed using a same server 108. Adding clients to system 700 is accomplished by connecting additional IP cameras to the IP network 106 and setting up a unique profile for defining parameters such as client-defined actionable events, and the response that is to be initiated when an actionable event is detected. Other than the video source and the gateway, no other infrastructure need be installed at the acquisition end. Furthermore, if wireless IP cameras are used then there is no need to run cables between the video source and a gateway.

Since client 'A' and client 'B' may require monitoring of different types of assets, optionally the rate of transmission of non-adjacent single frames of video data captured by video source 102A is different than the rate of transmission of non-adjacent single frames of video data captured by video source 102B. For instance, if video source 102A is monitoring a stack of shipping containers and video source 102B is monitoring a parking lot, then client 'A' may specify a slower rate of transmission and client 'B' may specify a faster rate of transmission. This is because expected changes in the video data captured using video source 102B are expected to be more transient in nature compared to the expected changes in the video data captured using video source 102A.

The embodiment that is shown in FIG. 7 does not include storage of video data at the acquisition end. Accordingly, server 108 performs video analytics in order to anticipate an actionable event. In other words, server 108 performs video analytics on non-adjacent single frames of video data that are transmitted from video sources 102A and 102B in order to detect as early as possible the occurrence of a change in the video data relative to a baseline condition. Once a change is detected in the video data that is transmitted from one of the video sources 102A or 102B, server 108 transmits a signal to the appropriate video source for initiating transmission of fuller frame-rate video data. For instance, the server requests either full frame-rate transmission, such as 30 FPS, or at least transmission of non-adjacent frames of video data at shorter time intervals, such as for instance one frame every half second. The fuller frame-rate video data is subjected to one or both of video analytics and review by a human operator, in order to determine if the detected change is indicative of an actionable event or if the detected change is merely a false alarm. If an actionable event is determined, then a client-defined response is initiated, such as for instance sending an alarm signal to the client via a telephone system or via a pager system. If a false alarm is determined, then typically the server 108 transmits a signal to the appropriate video source for returning the video source to the initial set rate of transmitting non-adjacent single frames of video data.

Optionally, a not illustrated video storage device is provided at the acquisition end in communication with one or both of video sources 102A and 102B. The operating principles of this optional embodiment are substantially similar to those of system 200, as described in detail with reference to FIG. 2. In particular, when server 108 detects an actionable event in the video data that is transmitted from video source 102A, a signal is transmitted via IP network 106 to the acquisition end requesting transmission of video data captured previously using video source 102A and stored on a not illustrated optional video storage device in communication therewith. Optionally, server 108 also transmits a signal to video source 102A for initiating transmission of fuller frame-rate video data therefrom.

Figure 8:
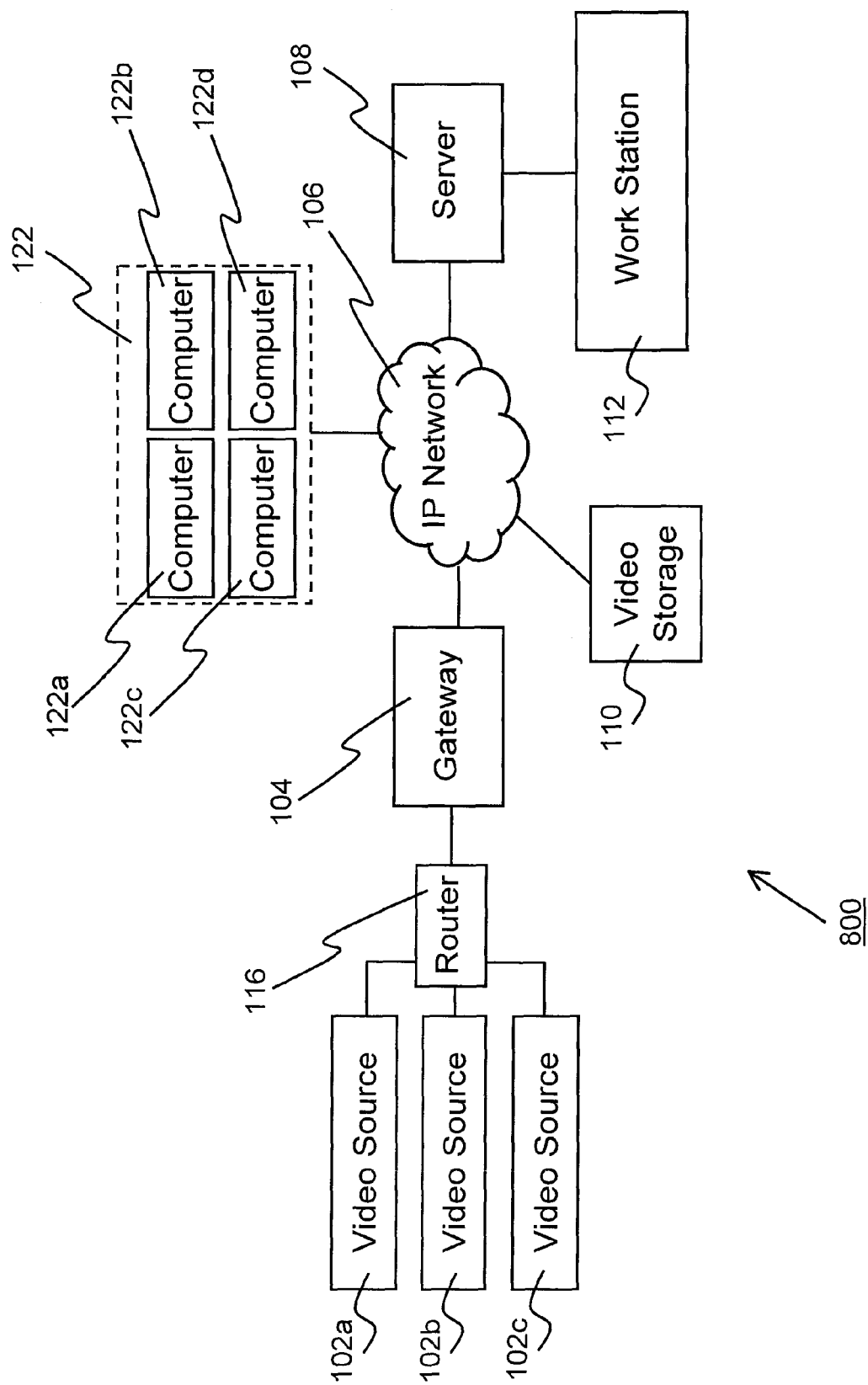
FIG. 8 is a schematic block diagram of another video monitoring system that is suitable for implementing a method according to an embodiment of the instant invention, including a plurality of video sources associated with a same client and a plurality of IP-network connected computers for performing video analytics on video data.

Referring now to FIG. 8, shown is a schematic block diagram of a video monitoring system 800 that is suitable for implementing a method according to an embodiment of the instant invention. In the embodiment of FIG. 8 a plurality of video sources 102*a-c* associated with a same client are disposed at the acquisition end for monitoring a known field of view (FOV). For example, a first video source 102*a* monitors a parking lot, a second video source 102*b* monitors an entry/exit point of a building, and a third video source 102*c* monitors a stack of shipping containers. Each one of the video sources 102*a-c* captures video data at a known frame rate, typically 30 FPS, and performs on-board compression of the captured video data using a suitable compression standard such as for instance MPEG-4 or H.264. Each video source provides non-adjacent single frames of compressed video data over an IP network 106 via router 116 and gateway 104. For instance, each video source 102*a-c* is set to transmit the contents of its frame buffer at predetermined intervals of time. In one embodiment the predetermined time intervals are different for at least some of the video sources 102a-c. In another embodiment, the predetermined time intervals are the same for each of the video sources 102a-c. Optionally, the video sources 102a-c connect to the IP network without a gateway 104.

Referring still to FIG. 8, a plurality of computers 122 is also in communication with the IP network 106. For instance, the plurality of computers 122 comprises personal computers that are connected to the IP network 106. By way of a specific and non-limiting example, the computers 122a-d are disposed in the offices that are occupied by a client associated with the video sources 102a-c. At any given time, it is likely that at least some of the computers 122a-d are inactive and therefore available for being used to process frames of captured video data according to a predetermined video analytics process. Furthermore, since video monitoring systems are of particular importance outside of normal working hours, there is a high likelihood that at least some of the computers 122a-d will be available for performing video analytics functions. Accordingly, the non-adjacent single frames of captured video data are transmitted via the IP network 106 to at least one computer 122a-d that is determined to be currently inactive. The at least one computer 122a-d performs video analytics on the non-adjacent single frames of captured video data for detecting actionable events. Of course, different actionable events may be defined based on the type of asset that is being monitored within the FOV of a particular video source 102a-c, and based upon the nature of unauthorized or suspicious activity that is anticipated. By way of a few specific and non-limiting examples, actionable events include: an unknown car entering a monitored parking lot; a visitor approaching a monitored building entry/exit point; and, removal of a monitored container from the FOV of a video source 102a-c. Accordingly, an actionable event is detected when a video analytics process identifies the occurrence of a client-defined change in a frame of captured video data, relative to a baseline condition. Typically, a video analytics process is used to search for a client-defined actionable event in a frame of video data that is captured at time t, relative to a frame of video data that is captured at time t−Δt. Typically, changes such as movement of foliage, weather conditions, street traffic, animal movements, etc. are ignored.

In order to facilitate a better understanding of the operating principles of the system that is shown in FIG. 8, the specific example of monitoring an entry/exit point of a building will now be discussed. The following discussion is provided for illustrative purposes only and is not intended to limit the system that is shown in FIG. 8 to any specific application. Prior to the occurrence of a client-defined actionable event, the video source 102a-c provide non-adjacent single frames of video data to at least one computer 122a-d via the IP network 106. For instance, the single non-adjacent frames are transmitted at ten second intervals. During this time, each transmitted frame contains video data that is substantially static based on the defined parameters of the video analytics process. When a visitor approaches the building entry-exit point, their image is captured by the video source 102a-c and is included in the frame of video data that is transmitted at the end of the next time interval. Video analytics is performed on the frame of video data that includes the image of the visitor, and an actionable event is detected based on identifying a change in the frame of video data relative to the previous non-adjacent frame of video data. Provided that the interval of time between transmission of successive non-adjacent frames of video data is sufficiently short, by the time the actionable event is detected the visitor is likely to be still some distance away from the building entry/exit point. Accordingly, in response to detecting the actionable event a signal is sent to the video source 102a-c requesting initiation of fuller frame-rate transmission of captured video data via the IP network 106. For instance, the server requests either full frame-rate transmission such as 30 FPS or at least transmission of non-adjacent frames of video data at shorter time intervals, such as for instance one frame every half second. The fuller frame-rate video data is stored on video storage device 110. Optionally, an alarm signal is provided to the client via one of the IP network 106, a not illustrated telephone system or a not illustrated pager service, etc. The client optionally accesses and reviews the fuller frame-rate video data using optional computer 114.

In system 800, the server 108 coordinates the "cycle stealing" among the computers 122a-d. Optionally, the computers 122a-d process the frames of captured video data using a basic video analytics process, and the server 108 is used to perform higher-level video analytics processing when the basic video analytics flags a potential actionable event. Further optionally the server 108 performs video analytics processing whenever none of the computers 122a-d are determined to be currently inactive.

Referring still to FIG. 8, according to an embodiment one of the video sources 102a-c is a "trigger" camera. For instance, video source 102a monitors the entry/exit point of a building and transmits single non-adjacent frames of captured video data via the IP network 106 at ten second intervals. Prior to the occurrence of an actionable event the other video sources 102b and 102c are inactive. When an actionable event is determined in the manner that is described above, a signal is transmitted via IP network 106 to video sources 102b and 102c, causing the video sources 102b and 102c to begin transmitting video data via IP network 106. Optionally, video sources 102b and 102c transmit full-frame rate video data via the IP network 106. Alternatively, less than full-frame rate video data is transmitted via the IP network 106. In either case, the video data is stored on video storage device 110.

Optionally, video sources 102b and 102c continue to transmit video data via IP network 106 for a predetermined period of time, or until a cancellation signal is received from. For instance, the cancellation signal is sent subsequent to the visitor being identified as an authorized individual, or in dependence upon some other criterion being satisfied. Optionally, full frame-rate video data or fuller frame-rate video data is also requested from the "trigger camera."

In a different mode of operation, video analytics is performed on each of the non-adjacent single frames of video data in order to confirm that the captured video data includes desired content. For instance, in a secure area such as a bank or an airport one or more video sources 102a-c are deployed for capturing images of the face of each visitor. Non-adjacent single frames of video data are transmitted via the IP network 106 at predetermined intervals of time, such as for instance one frame each second. When a result of video analytics performed on a frame of video data indicates that the frame contains a suitable image of a visitor's face, the frame of video data is stored in a log file on video storage device 110. Optionally, a signal is sent to the one or more video sources 102a-c to initiate transmission of single non-adjacent single frames of video data at a slower rate of transmission. Alternatively, frames of video data captured using the one or more video sources 102a-c are added to the log file in association with the previously stored frame containing the suitable image of the visitor's face. Such a log file is useful for identification purposes and tracking of visitors during a known period of time.

Figure 9:
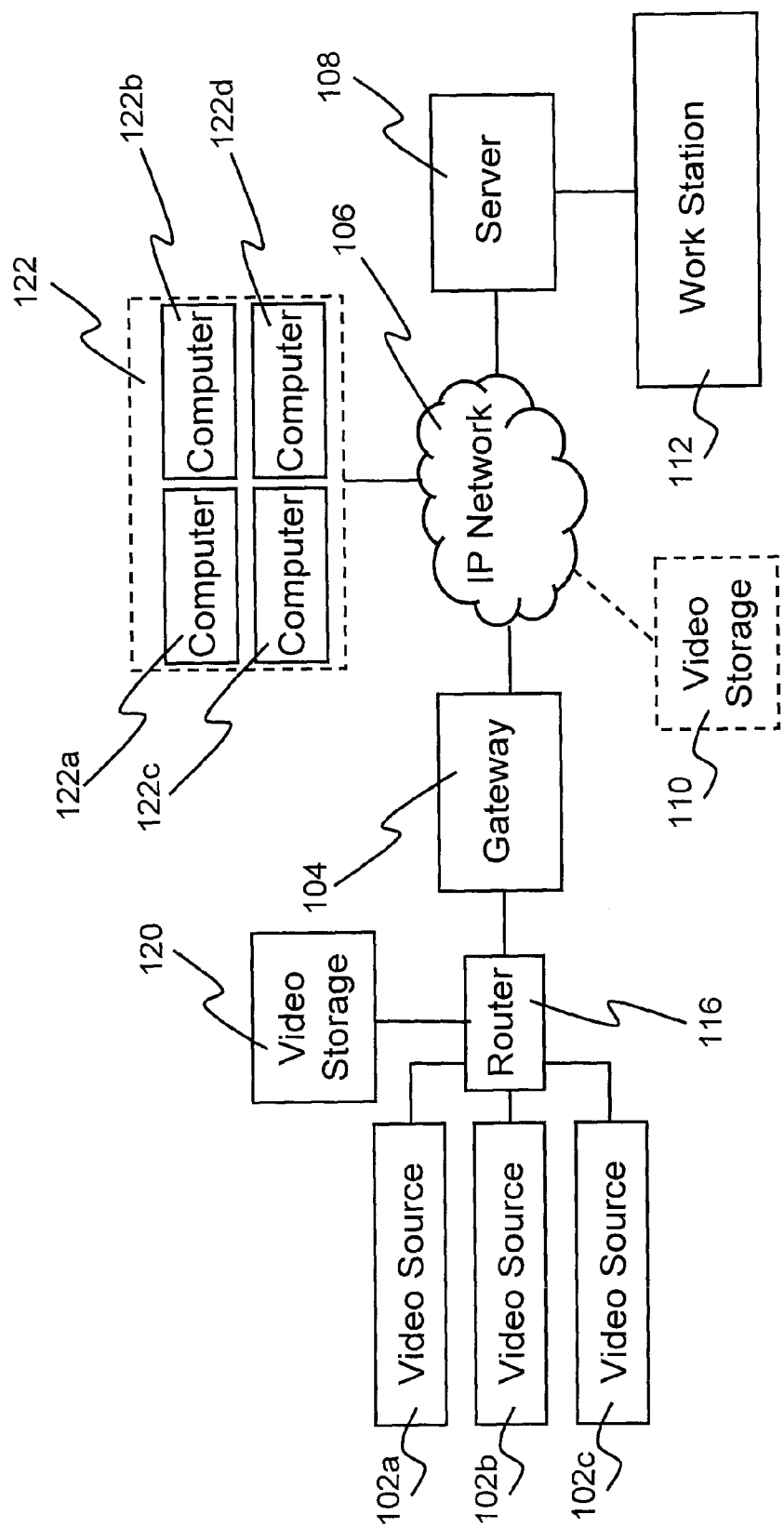
FIG. 9 is a schematic block diagram of another video monitoring system that is suitable for implementing a method according to an embodiment of the instant invention, including a plurality of video sources associated with a same client, a plurality of IP-network connected computers for performing video analytics on video data, and local storage of video data at the acquisition end.

Referring now to FIG. 9, shown is a schematic block diagram of a video monitoring system 900 that is suitable for implementing a method according to an embodiment of the instant invention. In the embodiment of FIG. 9 a plurality of video sources 102a-c associated with a same client are disposed at the acquisition end for monitoring a known field of view (FOV). For example, a first video source 102a monitors a parking lot, a second video source 102b monitors an entry/exit point of a building, and a third video source 102c monitors a stack of shipping containers. Each one of the video sources 102a-c captures video data at a known frame rate, typically 30 FPS, and performs on-board compression of the captured video data using a suitable compression standard such as for instance MPEG-4 or H.264. Each video source provides non-adjacent single frames of compressed video data over an IP network 106 via router 116 and gateway 104. For instance, each video source 102a-c is set to transmit the contents of its frame buffer at predetermined intervals of time. In one embodiment the predetermined time intervals are different for at least some of the video sources 102a-c. In another embodiment, the predetermined time intervals are the same for each of the video sources 102a-c. Optionally, the video sources 102a-c connect to the IP network without a gateway 104.

A video storage device 120 is also provided at the acquisition end in communication with router 116. By way of a specific and non-limiting example, the optional video storage device 110 is one of a digital video recorder (DVR) and a network video recorder (NVR). The video storage device 120 stores video data that is captured using video source 102. For instance, the video storage device 120 stores full frame-rate video data that is captured using video source 102. Alternatively, the video storage device 120 stores less than full frame-rate video data that is captured using video source 102.

Referring still to FIG. 9, a plurality of computers 122 is also in communication with the IP network 106. For instance, the plurality of computers 122 comprises personal computers that are connected to the IP network 106. By way of a specific and non-limiting example, the computers 122a-d are disposed in the offices that are occupied by a client associated with the video sources 102a-c. At any given time, at least some of the computers 122a-d may be inactive and therefore available for being used to process frames of captured video data according to a predetermined video analytics process. Furthermore, since video monitoring systems are of particular importance outside of normal working hours, there is a high likelihood that at least some of the computers 122a-d will be available for performing video analytics functions. Accordingly, the non-adjacent single frames of captured video data are transmitted via the IP network 106 to at least one computer 122a-d that is determined to be currently inactive. The at least one computer 122a-d performs video analytics on the non-adjacent single frames of captured video data for detecting actionable events. Of course, different actionable events may be defined based on the type of asset that is being monitored within the FOV of a particular video source 102a-c, and based upon the nature of unauthorized or suspicious activity that is anticipated. By way of a few specific and non-limiting examples, actionable events include: an unknown car entering a monitored parking lot; a visitor approaching a monitored building entry/exit point; and, removal of a monitored container from the FOV of a video source 102a-c. Accordingly, an actionable event is detected when a video analytics process identifies the occurrence of a client-defined change in a frame of captured video data, relative to a baseline condition. Typically, a video analytics process is used to search for a client-defined actionable event in a frame of video data that is captured at time t, relative to a frame of video data that is captured at time t−Δt or to more than a single previous frame of video data. Typically, changes such as movement of foliage, weather conditions, street traffic, animal movements, etc. are ignored.

In order to facilitate a better understanding of the operating principles of the system that is shown in FIG. 9, the specific example of monitoring a stack of shipping containers will now be discussed. Typically, a shipping container that is stored in a container yard or in another secure area remains stationary for long periods of time. Thus, non-adjacent single frames of captured video data that are transmitted to at least one of the computers 122a-d at one-minute time intervals, or even at time intervals of several minutes, are expected to include an image of the container. In this case, an actionable event occurs when the shipping container is identified within a frame of video data that is captured at time t−Δt, but it is not identified within the next non-adjacent frame of video data that is captured at time t or that is moved relative to an earlier position. In other words, removal or theft of the container occurred between transmission of the frame of video data captured at time t−Δt or earlier and the next non-adjacent frame of video data captured at time t. Assuming a sufficiently short interval of time Δt between transmission of successive non-adjacent single frames of captured video data, for instance between one second and one minute, the frame that is captured at time t may include image data of the removal in progress. As the interval of time Δt between transmission of successive non-adjacent single frames of captured video data increases, the likelihood decreases that the frame that is captured at time t will include image data of the removal in progress. However, in both instances when the actionable event is detected, a signal is transmitted via the IP network 106 to the video storage device 120 at the acquisition end requesting transmission of fuller frame-rate video data captured between the frame that is captured at time t−Δt and the frame that is captured at time t. Alternatively, video data over a longer period is transmitted or stored for later processing. In addition to requesting fuller frame-rate video data captured between time t−Δt and time t, optionally a signal is sent to video source 102a-c for initiating transmission of fuller frame-rate video data captured subsequent to time t. Optionally, video analytics is performed on each frame of the requested video data. Further optionally, the requested video data is provided to workstation 112 and/or to computer 114 to be reviewed by a human operator.

The video storage device 120 at the acquisition end supports storage of up to full frame-rate video data captured using video sources 102a-c. Since the storage device 120 is located at the acquisition end, it is not necessary to transmit full frame-rate video data over the IP network unless a request for full frame-rate video data is provided from server 108 in response to detecting an actionable event.

The systems that are shown in FIGS. 1 to 9 may employ any number of video sources, as determined by the client and as dictated by the nature of the assets that are being monitored. As the number of video sources increases, additional routers and gateways may be added as required in order to support transmission of video data that are captured by the video sources. Optionally, the captured video data are provided to an encoder to be compressed instead of performing the compression on-board a video camera. Further optionally, the video sources comprise analog devices. For instance, the video sources comprise an analog camera and the video data captured by the analog camera is digitized prior to being transmitted via the IP network or stored at the acquisition end.

Figure 10:
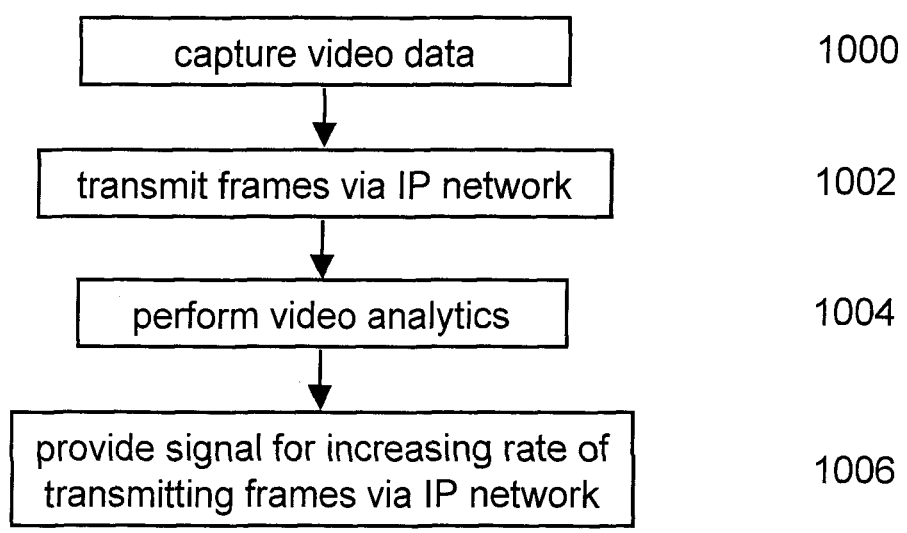
FIG. 10 is a simplified flow diagram of a method according to an embodiment of the instant invention.

Referring now to FIG. 10, shown is a simplified flow diagram of a method according to an embodiment of the instant invention. At 1000 video data are captured at a known frame rate using a video source disposed at an acquisition end. At 1002 non-adjacent single frames of the captured video data are transmitted to a central location via an IP network, the non-adjacent single frames of video data being transmitted at a first rate that is substantially slower than the known frame rate. At 1004 video analytics is performed on each of the non-adjacent single frames of captured video data for detecting an actionable event. At 1006, in response to detecting the actionable event, a signal is transmitted from the central location to the acquisition end via the IP network for increasing the rate of transmission of the non-adjacent single frames of video data to a second rate.

Figure 11:
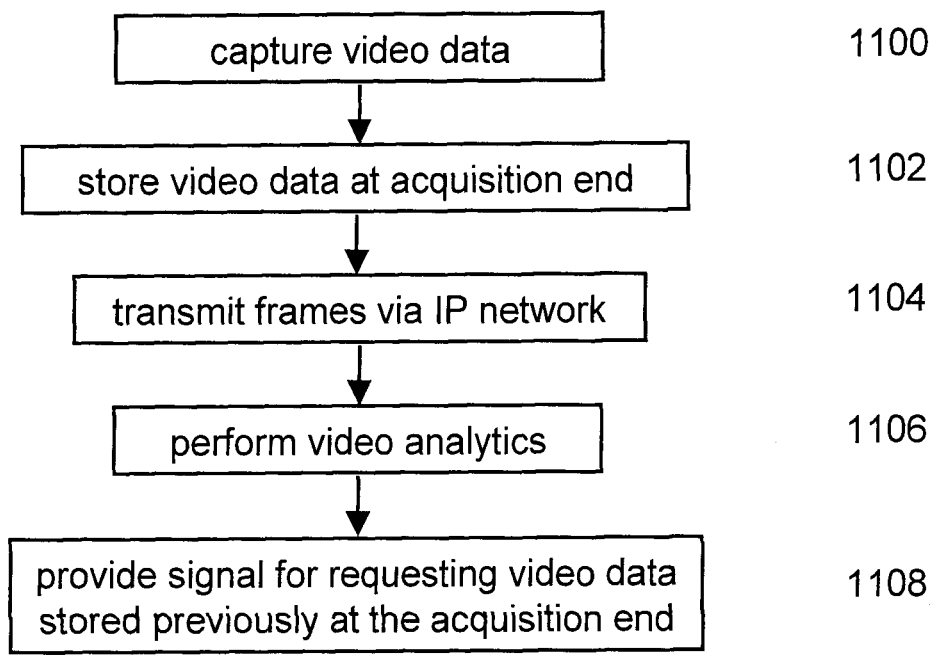
FIG. 11 is a simplified flow diagram of a method according to an embodiment of the instant invention.

Referring now to FIG. 11, shown is a simplified flow diagram of a method according to an embodiment of the instant invention. At 1100 video data is captured using a video source disposed at an acquisition end. At 1102 the captured video data is stored at the acquisition end. At 1004 non-adjacent single frames of the captured video data are transmitted from the acquisition end to a central location via an IP network, the non-adjacent single frames of captured video data being transmitted one at a time at known time intervals. At 1006 video analytics is performed on a current one of the non-adjacent single frames of video data for detecting an actionable event relative to a previous one of the non-adjacent single frames of video data. At 1008, in response to detecting an actionable event, a signal is transmitted from the central location to the acquisition end via the IP network for requesting previously stored video data captured between the current one of the non-adjacent single frames and the previous one of the non-adjacent single frames.

Figure 12:
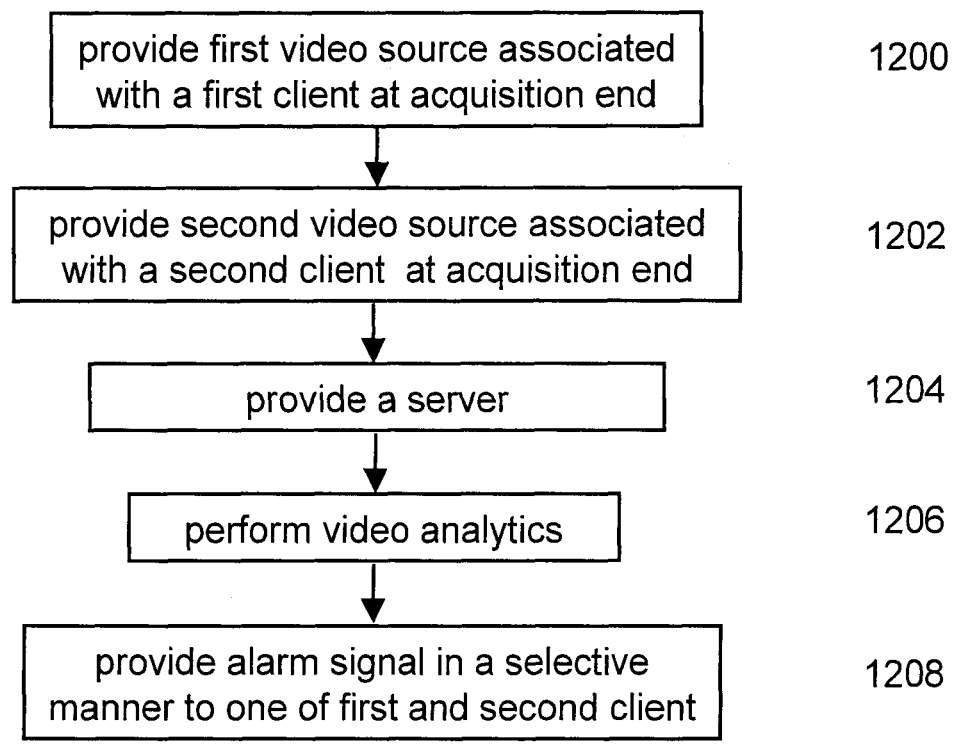
FIG. 12 is a simplified flow diagram of a method according to an embodiment of the instant invention; and, FIG. 13, shown is a simplified flow diagram of a method according to an embodiment of the instant invention.

Referring now to FIG. 12, shown is a simplified flow diagram of a method according to an embodiment of the instant invention. At 1200 a first video source is provided at an acquisition end, the first video source relating to a first client. At 1202 a second video source is provided at the acquisition end, the second video source relating to a second client. At 1204 a central server is provided, the central server in communication with the first and second video sources via an IP network. At 1206 video analytics is performed on video data provided separately to the server via the IP network from each one of the first video source and the second video source, the video analytics performed for detecting actionable events within the provided video data. At 1208 an alarm signal is provided in a selective manner to one of the first client and the second client in response to detecting an actionable event within the video data provided from one of the first video source and the second video source, respectively.

Figure 13:
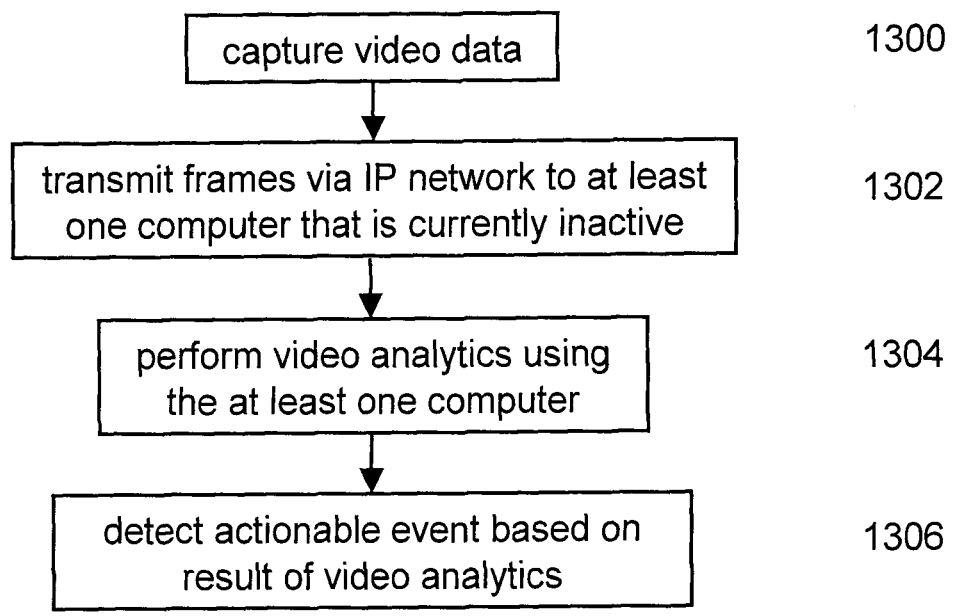

Referring now to FIG. 13, shown is a simplified flow diagram of a method according to an embodiment of the instant invention. At 1300 video data is captured at a known frame rate using a video source disposed at an acquisition end. At 1302 different non-adjacent single frames of the captured video data are transmitted to at least one computer of a plurality of different computers via an IP network, the at least one computer determined to be currently inactive. At 1304 the at least one computer of the plurality of different computers performs video analytics on the different non-adjacent single frames provided thereto. At 1306 an actionable event is detected based on a result of the video analytics performed by the at least one computer of the plurality of different computers.

Though some of the embodiments are described absent local storage of video data at the acquisition end, those embodiments are equally applicable to systems with video storage at the acquisition end and support the additional function of being able to store or provide historical data when an event is detected. Further, in some embodiments the video storage device is integrated within one or more video capture devices. For example, a video camera with flash memory set up as a loop recorder provides video data and video storage in a single device.

Numerous other embodiments may be envisaged without departing from the scope of the invention.

What is claimed is:

1. A method comprising:
capturing video data using a video source disposed at an acquisition end;
storing the captured video data at the acquisition end;
transmitting non-adjacent single frames of the captured video data from the acquisition end to a server via an IP network, the non-adjacent single frames of captured video data being transmitted one at a time at known time intervals and absent transmitting a series of consecutive frames of the video data captured between capturing the non-adjacent single frames;
at the server, performing video analytics on a current one of the non-adjacent single frames for detecting an actionable event relative to a previous one of the non-adjacent single frames; and,
in response to detecting an actionable event, transmitting to the acquisition end via the IP network a signal for requesting previously stored video data comprising the series of consecutive frames of the video data captured between capturing the current one of the non-adjacent single frames and the previous one of the non-adjacent single frames.

2. A method according to claim 1, wherein the known time intervals between transmitting consecutive non-adjacent single frames are substantially longer than an interval of time between capturing two adjacent single frames of the video data.

3. A method according to claim 1, comprising transmitting from the acquisition end to a remote location via the IP network the requested previously stored video data for at least one of storage and processing thereof.

4. A method according to claim 3, comprising performing at the remote location video analytics on frames of the requested previously stored video data for determining a first frame containing video data relating to the detected actionable event.

5. A method according to claim 3, comprising displaying the requested previously stored video data for being viewed by a user.

6. A method according to claim 1, comprising providing an alarm signal in response to detecting the actionable event.

7. A method according to claim 1, comprising in response to detecting the actionable event, transmitting to the acquisition end via the IP network a signal for decreasing a duration of the time intervals between transmission of consecutive non-adjacent single frames.

8. A method according to claim 1, comprising in response to detecting the actionable event, transmitting to the acquisition end via the IP network a signal for requesting transmission of full frame rate video data from the video source disposed at the acquisition end.

9. A method comprising:
capturing video data at a known frame rate using a video source disposed at an acquisition end;

transmitting non-adjacent single frames of the captured video data to a remote location via an IP network, the non-adjacent single frames of video data being transmitted at a first rate that is substantially slower than the known frame rate, and absent transmitting a series of consecutive frames of the video data captured between capturing the non-adjacent single frames;

at a remote location, performing video analytics on each of the non-adjacent single frames of captured video data for detecting an actionable event; and, in response to detecting the actionable event, transmitting from a remote location to the acquisition end via the IP network a signal for increasing the rate of transmission of the non-adjacent single frames of video data to a second rate.

10. A method according to claim 9, comprising providing an alarm signal in response to detecting the actionable event.

11. A method according to claim 9, wherein the first rate of transmitting the non-adjacent single frames of the captured video data is at least thirty times slower than the known frame rate.

12. A method according to claim 9, wherein the second rate is substantially the same as the known frame rate of capturing the video data.

13. A method comprising:

capturing first video data using a first video source at a first acquisition end, the first video source relating to a first client, and the first video data being captured at a known first frame rate;

capturing second video data using a second video source at a second acquisition end, the second video source relating to a second client, and the second video data being captured at a known second frame rate;

providing a server that is in communication with the first and second video sources via an IP network;

transmitting non-adjacent single frames of the captured first video data to the server via the IP network at a first transmission rate that is substantially slower than the known first frame rate and absent transmitting a series of consecutive frames of the first video data captured between capturing the non-adjacent single frames of the first video data;

transmitting non-adjacent single frames of the captured second video data to the server via the IP network at a second transmission rate that is substantially slower than the known second frame rate and absent transmitting a series of consecutive frames of the second video data captured between capturing the non-adjacent single frames of the second video data;

using the server, performing video analytics on the non-adjacent single frames of the captured first video data and the non-adjacent single frames of the captured second video data, the video analytics performed for detecting actionable events within the provided video data; and, providing in a selective manner an alarm signal to one of the first client and the second client in response to detecting an actionable event within the video data provided from one of the first video source and the second video source, respectively.

14. A method according to claim 13, wherein the first transmission rate is different than the second transmission rate.

15. A method according to claim 14, wherein the first transmission rate is selected for detecting a first type of actionable event and the second transmission rate is selected for detecting a second type of actionable event.

16. A method according to claim 13, wherein providing the server comprises providing the server at a location that is remote from both the first video source and the second video source.

17. A method according to claim 13, wherein the first acquisition end and the second acquisition end are at a same location.

18. A method comprising:

providing a server farm comprising a plurality of servers;

providing a video source at an acquisition end, the video source in communication with the server farm via the IP network;

capturing video data at a known frame rate using the video source at the acquisition end;

transmitting non-adjacent single frames of the captured video data to the server farm via the IP network, absent transmitting a series of consecutive frames of the video data captured between capturing the non-adjacent single frames;

performing video analytics on the non-adjacent single frames of the captured video data using the plurality of servers of the server farm; and, detecting an actionable event based on a result of the video analytics performed by at least one server of the plurality of servers of the server farm.

19. A method according to claim 18, wherein the non-adjacent single frames are transmitted at a first rate that is substantially slower than the known frame rate.

20. A method according to claim 18, wherein different servers of the plurality of servers of the server farm perform video analytics on the non-adjacent single frames of the captured video data using different video analytics processes.

21. A method according to claim 18, wherein different servers of the plurality of servers of the server farm perform video analytics on the non-adjacent single frames of the captured video data in parallel using a same video analytics process.

22. A method according to claim 18, wherein each different server of the plurality of servers of the server farm perform video analytics on a different one of the non-adjacent single frames of the captured video data using a same video analytics process.

23. A method according to claim 19, comprising in response to detecting the actionable event, transmitting to the acquisition end via the IP network a signal for increasing the rate of transmission of the non-adjacent single frames of video data to a second rate.

* * * * *